United States Patent
Paluri et al.

(10) Patent No.: US 12,531,985 B2
(45) Date of Patent: Jan. 20, 2026

(54) CIIP-BASED PREDICTION METHOD AND DEVICE

(71) Applicant: LG Electronics Inc., Seoul (KR)

(72) Inventors: Seethal Paluri, Seoul (KR); Jaehyun Lim, Seoul (KR); Hyeongmoon Jang, Seoul (KR); Seunghwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/697,617

(22) PCT Filed: Sep. 30, 2022

(86) PCT No.: PCT/KR2022/014757
§ 371 (c)(1),
(2) Date: Apr. 1, 2024

(87) PCT Pub. No.: WO2023/055172
PCT Pub. Date: Apr. 6, 2023

(65) Prior Publication Data
US 2024/0414327 A1     Dec. 12, 2024

Related U.S. Application Data

(60) Provisional application No. 63/251,043, filed on Oct. 1, 2021.

(51) Int. Cl.
H04N 19/107    (2014.01)
H04N 19/109    (2014.01)
(Continued)

(52) U.S. Cl.
CPC ......... H04N 19/107 (2014.11); H04N 19/109 (2014.11); H04N 19/11 (2014.11);
(Continued)

(58) Field of Classification Search
CPC .... H04N 19/107; H04N 19/109; H04N 19/11; H04N 19/132; H04N 19/147;
(Continued)

(56) References Cited

U.S. PATENT DOCUMENTS

2010/0086030 A1 * 4/2010 Chen .................... H04N 19/147
                                                                      375/E7.243
2018/0249156 A1 * 8/2018 Heo ........................ H04N 19/70
(Continued)

FOREIGN PATENT DOCUMENTS

KR     10-2013-0054461    5/2013
KR     10-2018-0041211    4/2018
(Continued)

OTHER PUBLICATIONS

International Search Report and Written Opinion in International Appln. No. PCT/KR2022/014757, mailed on Jan. 10, 2023, 16 pages (with English translation).
(Continued)

*Primary Examiner* — Marnie A Matt
(74) *Attorney, Agent, or Firm* — Fish & Richardson P.C.

(57) ABSTRACT

An image decoding method performed by a decoding device includes: obtaining image information including prediction-related information from a bitstream; determining whether combined inter-picture merge and intra-picture prediction (CIIP) is applied to a current block, on the basis of the prediction-related information; deriving a prediction sample of the current block on the basis of it being determined that the CIIP is applied to the current block; and generating a reconstructed sample of the current block on the basis of the prediction sample, wherein the prediction sample of the current block is derived on the basis of an intra prediction sample and an inter prediction sample, wherein the intra prediction sample is derived on the basis of an intra predic-
(Continued)

tion mode, wherein the intra prediction mode is derived on the basis of a decoder side intra mode derivation (DIMD) mode or a template-based inter mode derivation (TIMD) mode.

15 Claims, 15 Drawing Sheets

(51) Int. Cl.
| | |
|---|---|
| *H04N 19/11* | (2014.01) |
| *H04N 19/132* | (2014.01) |
| *H04N 19/147* | (2014.01) |
| *H04N 19/159* | (2014.01) |
| *H04N 19/172* | (2014.01) |
| *H04N 19/176* | (2014.01) |
| *H04N 19/503* | (2014.01) |
| *H04N 19/593* | (2014.01) |
| *H04N 19/70* | (2014.01) |

(52) U.S. Cl.
CPC ......... *H04N 19/132* (2014.11); *H04N 19/147* (2014.11); *H04N 19/159* (2014.11); *H04N 19/172* (2014.11); *H04N 19/176* (2014.11); *H04N 19/503* (2014.11); *H04N 19/593* (2014.11); *H04N 19/70* (2014.11)

(58) Field of Classification Search
CPC .. H04N 19/159; H04N 19/172; H04N 19/176; H04N 19/503; H04N 19/593; H04N 19/70; H04N 19/105; H04N 19/52; H04N 19/119

USPC .................................................... 375/240.13
See application file for complete search history.

(56) References Cited

U.S. PATENT DOCUMENTS

| | | | |
|---|---|---|---|
| 2019/0215521 | A1 | 7/2019 | Chuang et al. |
| 2021/0006803 | A1* | 1/2021 | Zhang .................... H04N 19/18 |
| 2022/0417511 | A1* | 12/2022 | Li .......................... H04N 19/46 |
| 2023/0090700 | A1* | 3/2023 | Teng .................... H04N 19/176 |
| | | | 375/240.02 |
| 2023/0283786 | A1* | 9/2023 | Zhang ................. H04N 19/137 |
| | | | 375/240.02 |

FOREIGN PATENT DOCUMENTS

| | | | |
|---|---|---|---|
| KR | 10-2021-0087450 | 7/2021 | |
| WO | WO-2024044404 A1 * | 2/2024 | ............. H04N 19/52 |

OTHER PUBLICATIONS

Li et al., "EE2-related: A combination of CIIP and DIMD/TIMD," Joint Video Experts Team (JVET) of ITU-T SG 16 WP 3 and ISO/IEC JTC 1/SC 29, JVET-W0068-v2, by teleconference, Meeting #23, Jul. 7-16, 2021, 7 pages.

* cited by examiner

CIIP-BASED PREDICTION METHOD AND DEVICE

CROSS-REFERENCE TO RELATED APPLICATIONS

This application is a National Stage application under 35 U.S.C. § 371 of International Application No. PCT/KR2022/014757, filed on Sep. 30, 2022, which claims the benefit of U.S. Provisional Application No. 63/251,043, filed on Oct. 1, 2021. The disclosures of the prior applications are incorporated by reference in their entirety.

TECHNICAL FIELD

The present disclosure relates to image coding technology, and more specifically, to a video decoding method and apparatus for deriving intra prediction mode in an image coding system.

BACKGROUND ART

Recently, the demand for high resolution, high quality image/video such as 4K, 8K or more Ultra High Definition (UHD) video/image is increasing in various fields. As the video/image resolution or quality becomes higher, relatively more amount of information or bits are transmitted than for conventional video/image data. Therefore, if video/image data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual video/image, such as game images/videos, are also growing.

Therefore, a highly efficient image compression technique is required to effectively compress and transmit, store, or play high resolution, high quality video/image showing various characteristics as described above.

SUMMARY

The present disclosure provides a method and an apparatus for increasing image coding efficiency.

The present disclosure also provides a method and an apparatus for performing efficient intra prediction in image coding.

Another technical task of this document is to provide a method and device for performing efficient inter prediction in video coding.

According to an embodiment of this document, a video decoding method performed by a decoding device is provided. The method includes obtaining image information including prediction-related information from a bitstream, determining whether Combined Inter-picter Merge and Intra-picture Prediction (CIIP) is applied to the current block based on the prediction-related information, deriving a prediction sample of the current block based on the determination that the CIIP applies to the current block, and generating a restored sample of the current block based on the prediction sample, the prediction sample of the current block is derived based on intra prediction samples and inter prediction samples, the intra prediction sample is derived based on the intra prediction mode, the intra prediction mode is derived based on DIMD (Decoder Side Intra Mode Derivation) mode or TIMD (Template-based Inter Mode Derivation) mode.

According to another embodiment of this document, an encoding method performed by an encoding device is provided. The method includes determining whether Combined Inter-picter merge and Intra-picture Prediction (CIIP) is applied to the current block, determining an intra prediction mode, deriving an intra prediction sample based on the intra prediction mode, deriving an inter prediction sample, deriving a prediction sample of the current block based on the intra prediction sample and the inter prediction sample, generating prediction-related information based on the prediction sample of the current block, and encoding image information including the prediction-related information, the intra prediction mode is determined based on DIMD (Decoder Side Intra Mode Derivation) mode or TIMD (Template-based Inter Mode Derivation) mode.

According to another embodiment of the present document, a computer-readable digital storage medium is provided. The digital storage medium stores a bitstream generated by a specific method, the specific method includes, determining whether Combined Inter-picter merge and Intra-picture Prediction (CIIP) is applied to the current block, determining an intra prediction mode, deriving an intra prediction sample based on the intra prediction mode, deriving an inter prediction sample, deriving a prediction sample of the current block based on the intra prediction sample and the inter prediction sample, generating prediction-related information based on the prediction sample of the current block, and encoding image information including the prediction-related information, the intra prediction mode is determined based on DIMD (Decoder Side Intra Mode Derivation) mode or TIMD (Template-based Inter Mode Derivation) mode.

According to another embodiment of this document, provided is a computer-readable digital storage medium storing encoded information or encoded video/image information that causes a decoding device to perform the video/image decoding method disclosed in at least one of the embodiments of this document.

According to another embodiment of this document, a method and transmission device for transmitting a bitstream generated according to the video/image encoding method disclosed in at least one of the embodiments of this document are provided.

According to this document, this includes, obtaining image information including prediction-related information from a bitstream, determining whether Combined Inter-picter Merge and Intra-picture Prediction (CIIP) is applied to the current block based on the prediction-related information, deriving a prediction sample of the current block based on the determination that the CIIP applies to the current block, and generating a restored sample of the current block based on the prediction sample, the prediction sample of the current block is derived based on intra prediction samples and inter prediction samples, the intra prediction sample is derived based on the intra prediction mode, the intra prediction mode is derived based on DIMD (Decoder Side Intra Mode Derivation) mode or TIMD (Template-based Inter Mode Derivation) mode. At this time, the intra prediction mode can be derived based on the DIMD mode or TIMD mode to reduce the overhead occurring in the process of signaling the intra prediction mode and improve overall coding efficiency. Additionally, prediction accuracy can be increased by deriving a prediction sample based on the DIMD mode or an intra prediction mode derived based on the TIMD mode.

MODE

Figure 1:
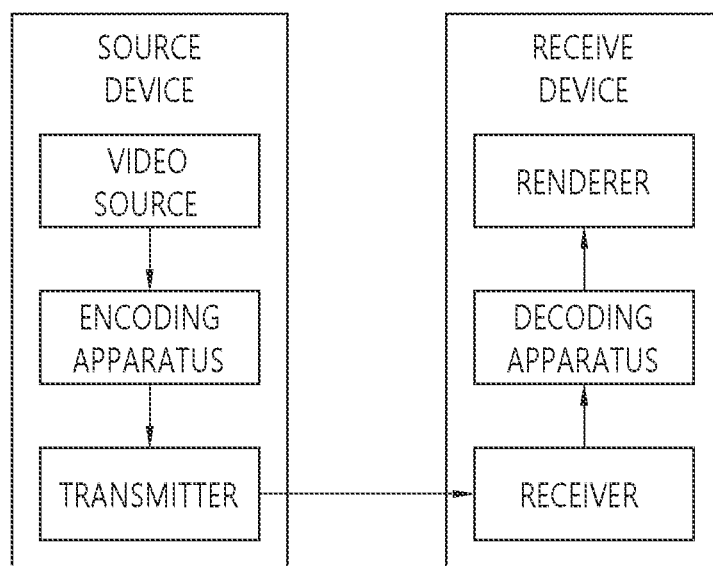
FIG. 1 schematically illustrates an example of a video/image coding device to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

Present disclosure relates to video/image coding. For example, the methods/embodiments disclosed in the present disclosure may be related to the versatile video coding (VVC) standard (ITU-T Rec. H.266), the next-generation video/image coding standard after VVC, or other video coding related standards (for example, the High Efficiency Video Coding (HEVC) standard (ITU-T Rec. H.265), essential video coding (EVC) standard, AVS2 standard, etc.).

Present disclosure relates to video/image coding. For example, the methods/embodiments disclosed in the present disclosure may be applied to a method disclosed in the versatile video coding (VVC) standard, the essential video coding (EVC) standard, the AOMedia Video 1 (AV1) standard, the 2nd generation of audio video coding standard (AVS2), or the next generation video/image coding standard (e.g., H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a subpicture/slice/tile is a unit constituting part of a picture in coding. The subpicture/slice/tile may include one or more coding tree units (CTUs). One picture may consist of one or more subpictures/slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. In addition, a subpicture may represent a rectangular region of one or more slices within a picture. That is, a subpicture contains one or more slices that collectively cover a rectangular region of a picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present description, "A or B" may mean "only A", "only B" or "both A and B". In other words, in the present specification, "A or B" may be interpreted as "A and/or B". For example, "A, B or C" herein means "only A", "only B", "only C", or "any and any combination of A, B and C".

A slash (/) or a comma (comma) used in the present description may mean "and/or". For example, "A/B" may mean "A and/or B". Accordingly. "A/B" may mean "only A". "only B", or "both A and B". For example, "A, B, C" may mean "A, B, or C".

In the present description, "at least one of A and B" may mean "only A", "only B", or "both A and B". In addition, in the present description, the expression "at least one of A or B" or "at least one of A and/or B" may be interpreted the same as "at least one of A and B".

In addition, in the present description. "at least one of A, B and C" means "only A", "only B", "only C", or "any combination of A, B and C". Also, "at least one of A, B or C" or "at least one of A, B and/or C" may mean "at least one of A, B and C".

In addition, parentheses used in the present description may mean "for example". Specifically, when "prediction (intra prediction)" is indicated, "intra prediction" may be proposed as an example of "prediction". In other words, "prediction" in the present description is not limited to "intra prediction", and "intra prediction" may be proposed as an example of "prediction". Also, even when "prediction (ie, intra prediction)" is indicated, "intra prediction" may be proposed as an example of "prediction".

In the present description, technical features that are individually described within one drawing may be implemented individually or may be implemented at the same time.

The following drawings were created to explain a specific example of the present description. Since the names of specific devices described in the drawings or the names of specific signals/messages/fields are presented by way of example, the technical features of the present description are not limited to the specific names used in the following drawings.

FIG. 1 schematically illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
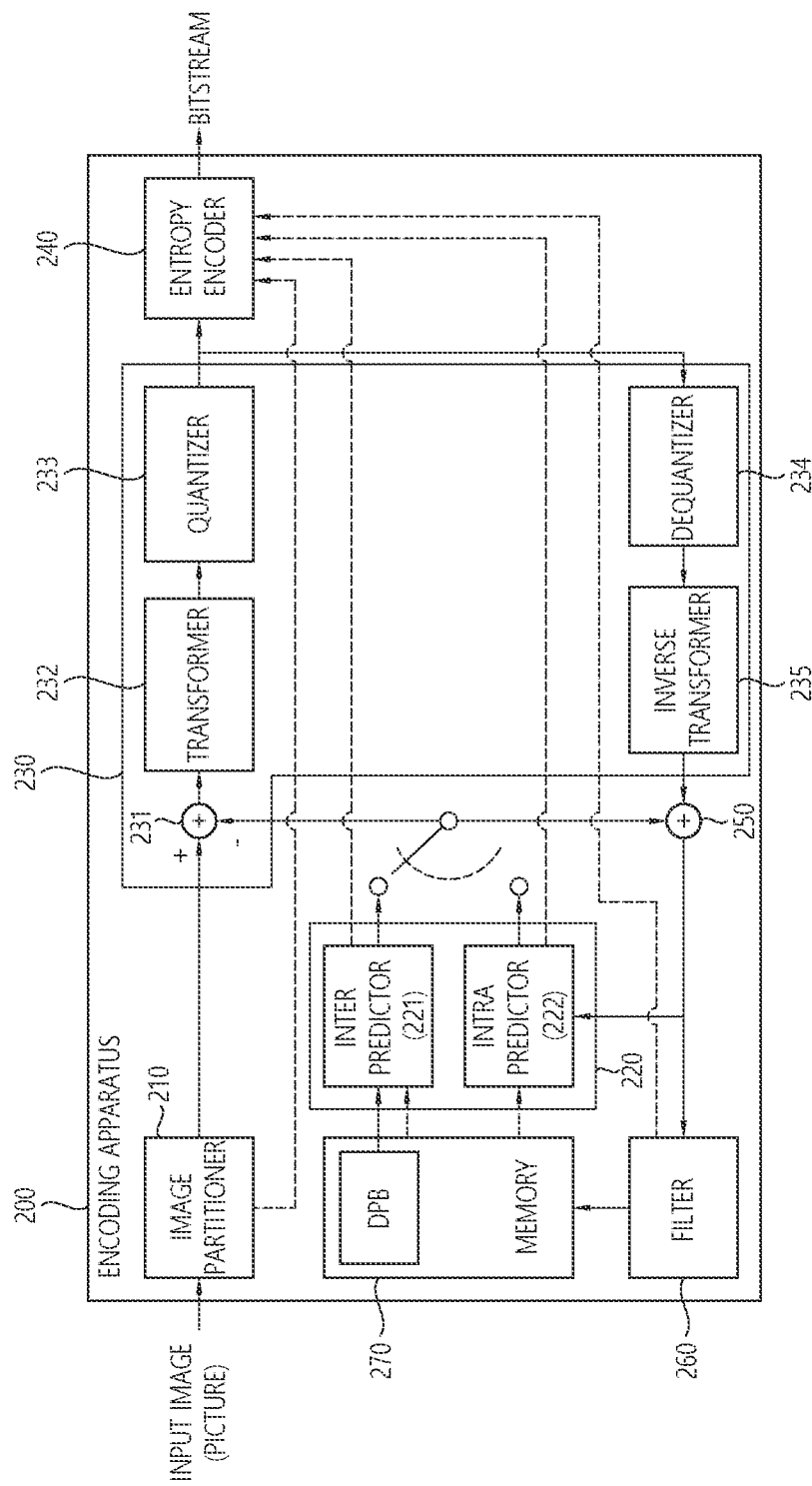
FIG. 2 is a schematic diagram illustrating a configuration of a video/image encoding apparatus to which the embodiment(s) of the present disclosure may be applied.

FIG. 2 is a schematic diagram illustrating a configuration of a video/image encoding apparatus to which the present document may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding process according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a process of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the subtractor 231, a prediction signal (predicted block, prediction samples or prediction sample array) output from the predictor 220 is subtracted from an input image signal (original block, original samples or original sample array) to generate a residual signal (residual block, residual samples or residual sample array), and the generated residual signal is transmitted to the transformer 232. The predictor 220 may perform prediction on a block to be processed (hereinafter, referred to as a current block) and generate a predicted block including prediction samples for the current block. The predictor 220 may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may perform an intra block copy (IBC) prediction mode. The IBC, for example, may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure.

The prediction signal generated by the inter predictor 221 and/or the intra predictor 222 may be used to generate a reconstructed signal or to generate a residual signal. The transformer 232 may generate transform coefficients by applying a transform technique to the residual signal. For example, the transform technique may include a discrete cosine transform (DCT), a discrete sine transform (DST), a graph-based transform (GBT), or a conditionally non-linear transform (CNT), etc. Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g., values of syntax elements, etc.) together or separately. Encoded information (e.g., encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements to be described later may be encoded through the above-described encoding process and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the predictor 220 to generate a reconstructed signal (reconstructed picture, reconstructed block, reconstructed sample array). If there is no residual for the block to be processed, such as a case where the skip mode is applied, the predicted block may be used as the reconstructed block. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset (SAO), an adaptive loop filter, a bilateral filter, and the like. The filter 260 may generate various information related to the filtering and transmit the generated information to the entropy encoder 290 as described later in the description of each filtering method. The information related to the filtering may be encoded by the entropy encoder 290 and output in the form of a bitstream.

The modified reconstructed picture transmitted to the memory 270 may be used as the reference picture in the inter predictor 260. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
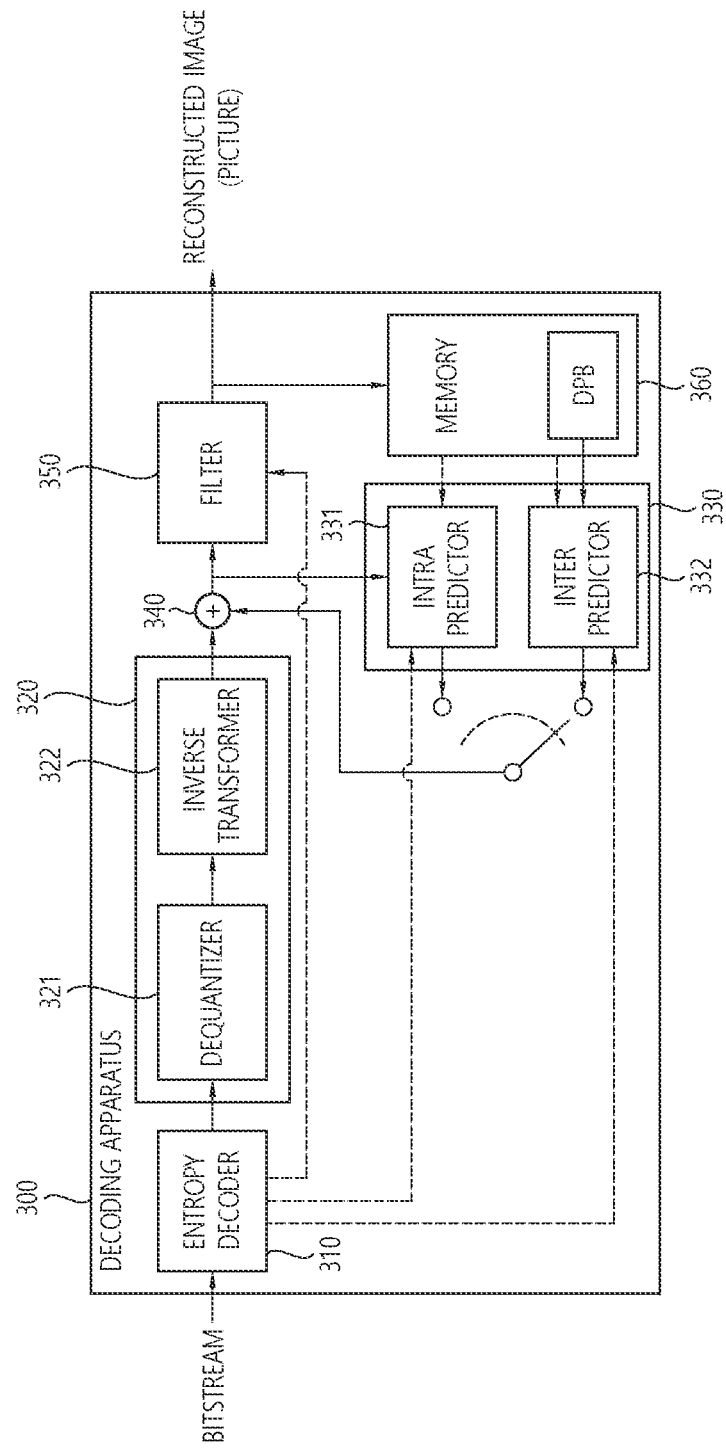
FIG. 3 is a schematic diagram illustrating a configuration of a video/image decoding apparatus to which the embodiment(s) of the present disclosure may be applied.

FIG. 3 is a schematic diagram illustrating a configuration of a video/image decoding apparatus to which the present document may be applied.

Referring to FIG. 3, the decoding apparatus 300 may include an entropy decoder 310, a residual processor 320, a predictor 330, an adder 340, a filter 350, a memory 360. The predictor 330 may include an inter predictor 332 and an intra predictor 331. The residual processor 320 may include a dequantizer 333 and an inverse transformer 322. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding process and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor 330, and information on the residual on which the entropy decoding was performed in the entropy decoder 310, that is, the quantized transform coefficients and related parameter information, may be input to the dequantizer 321. In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the predictor 330, the adder 340, the filter 350, and the memory 360.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex, quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may perform an intra block copy (IBC) for prediction of a block. The IBC may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 332 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In this specification, the embodiments described in the predictor 330, the dequantizer 321, the inverse transformer 322, and the filter 350 of the decoding apparatus 300 may be applied to the same or correspond to the predictor 220, the dequantizer 234, the inverse transformer 235, and the filter 260 of the encoding apparatus 200 respectively.

As described above, in performing video coding, prediction is performed to increase compression efficiency. Through this, it is possible to generate a predicted block including prediction samples for the current block, which is a block to be coded. Here, the predicted block includes prediction samples in the spatial domain (or pixel domain). The predicted block is derived in the same way from an encoding apparatus and a decoding apparatus, and the encoding apparatus can increase image coding efficiency by signaling information (residual information) between the original block and the predicted block to the decoding apparatus, not the original sample value of the original block itself. The decoding apparatus can derive a residual block containing residual samples based on the above residual information, combine the above residential block with the above predicted block to create a restore block containing restoration samples, and create a restore picture containing restoration blocks.

The residual information may be generated through a transform and quantization process. For example, the encoding apparatus may derive a residual block between the original block and the predicted block, derive transform coefficients by performing the transform process on the residual samples (residual sample array) included in the residual block, derive quantized transform coefficients by performing the quantization process on the transform coefficients, and signaling related residual information (through a bitstream) to the decoding apparatus. Here, the residual information may include information such as value information, position information, transform technique, transform kernel, quantization parameter of the quantized transform coefficients, etc. The decoding apparatus may perform a dequantization/inverse transform process based on the residual information and derive residual samples (or residual blocks). The decoding apparatus may generate a reconstructed picture based on the predicted block and the residual block. The encoding apparatus may also derive a residual block by dequantizing/inverse transforming quantized transform coefficients for reference to the inter-prediction of the picture, and generate a reconstructed picture based on this.

In the present disclosure, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or the information on the transform coefficient(s)), and scaled transform coefficients may be derived by inverse transforming (scaling) on the transform coefficients. Residual samples may be derived based on the inverse transforming (transforming) on the scaled transform coefficients. This may be applied/expressed in other parts of the present disclosure as well.

In this document, quantized transform coefficients and transform coefficients may be referred to as transform coefficients and scaled transform coefficients, respectively. In this case, the residual information may include information on transform coefficient(s), and the information on the transform coefficient(s) may be signaled through residual coding syntax. Transform coefficients may be derived based on the residual information (or information about the transform coefficient(s)), and scaled transform coefficients may be derived through inverse transform (scaling) of the transform coefficients. Residual samples may be derived based on an inverse transform (transform) to the scaled transform coefficients. This may be applied/expressed in other parts of this document as well.

A predictor of the encoding apparatus/decoding apparatus may derive prediction samples by performing inter prediction on a block-by-block basis. Inter prediction can be a prediction derived in a manner that is dependent on data elements (e.g., sample values or motion information) of picture(s) other than the current picture. When inter prediction is applied to the current block, a predicted block (prediction sample array) for the current block may be derived based on a reference block (reference sample array) specified by a motion vector in a reference picture indicated by a reference picture index. In this case, in order to reduce the amount of motion information transmitted in the inter-prediction mode, motion information of the current block may be predicted in units of blocks, subblocks, or samples based on correlation of motion information between neighboring blocks and the current block. The motion information may include a motion vector and a reference picture index. The motion information may further include inter prediction type (L0 prediction, L1 prediction, Bi prediction, etc.) information. When inter prediction is applied, the neighboring block may include a spatial neighboring block present in the current picture and a temporal neighboring block present in the reference picture. A reference picture including the reference block and a reference picture including the temporal neighboring block may be the same or different. The temporal neighboring block may be called a collocated reference block, a collocated CU (colCU), and the like, and a reference picture including the temporal neighboring block may be called a collocated picture (colPic). For example, a motion information candidate list may be constructed based on neighboring blocks of the current block, and a flag or index information indicating which candidate is selected (used) to derive the motion vector and/or reference picture index of the current block may be signaled. Inter prediction may be performed based on various prediction modes. For example, in the case of skip mode and merge mode, motion information of a current block may be the same as motion information of a selected neighboring block. In the case of the skip mode, the residual signal may not be transmitted unlike the merge mode. In the case of a motion vector prediction (MVP) mode, a motion vector of a selected neighboring block is used as a motion vector predictor, and a motion vector difference may be signaled. In this case, the motion vector of the current block may be derived using the sum of the motion vector predictor and the motion vector difference.

The motion information may include L0 motion information and/or L1 motion information according to an inter prediction type (L0 prediction, L1 prediction, Bi prediction, etc.). A motion vector in the L0 direction may be referred to as an L0 motion vector or MVL0, and a motion vector in the L1 direction may be referred to as an L1 motion vector or MVL1. Prediction based on the L0 motion vector may be called L0 prediction, prediction based on the L1 motion vector may be called L1 prediction, and prediction based on both the L0 motion vector and the L1 motion vector may be called Bi prediction. Here, the L0 motion vector may indicate a motion vector related to the reference picture list L0 (L0), and the L1 motion vector may indicate a motion vector related to the reference picture list L1 (L1). The reference picture list L0 may include pictures prior to the current picture in output order as reference pictures, and the reference picture list L1 may include pictures subsequent to the current picture in output order. The previous pictures may be referred to as forward (reference) pictures, and the subsequent pictures may be referred to as backward (reference) pictures. The reference picture list L0 may further include subsequent pictures in an output order as reference pictures than the current picture. In this case, the previous pictures in the reference picture list L0 may be indexed first, and the later pictures may be indexed next. The reference picture list L1 may further include, as reference pictures, pictures previous to the current picture in output order. In this case, the subsequent pictures in the reference picture list 1 may be indexed first, and the previous pictures may be indexed next. Here, the output order may correspond to a picture order count (POC) order.

Figure 4:
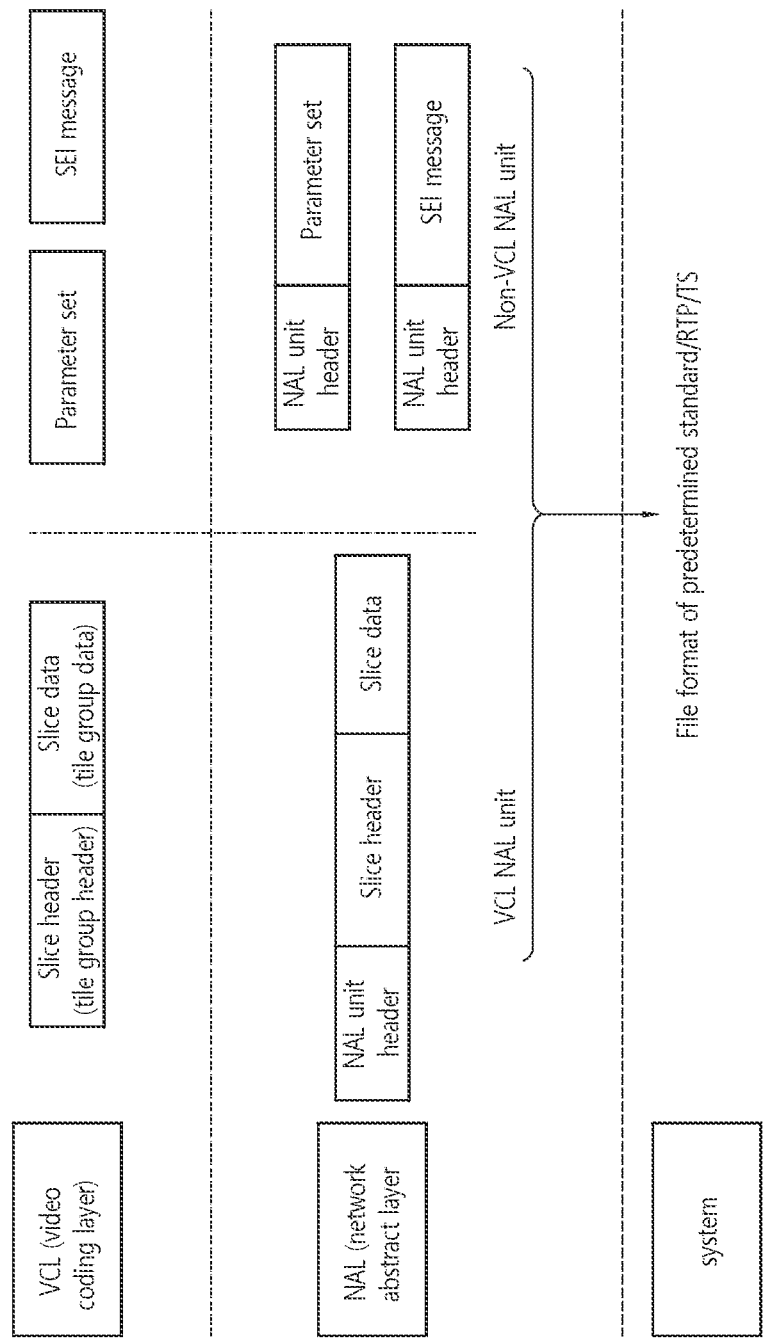
FIG. 4 schematically shows a hierarchical structure for coded video/image.

FIG. 4 exemplarily illustrates a layer structure for a coded video/image.

Referring to FIG. 4, a coded video/image is divided into a video coding layer (VCL) that performs decoding processing of a video/image and handles the decoding processing, a lower system that transmits and stores coded information, and a network abstraction layer (NAL) which exists between the VCL and the lower system, and serves to perform a network adaptation function.

VCL data including compressed image data (slice data), or a parameter set including a picture parameter set (PPS), a sequence parameter set (SPS), or a video parameter set (VPS), or a supplemental enhancement information (SEI) message additionally required in an image decoding process may be generated, in the VCL.

In the NAL, header information (NAL unit data) is added to a raw byte sequence payload (RSRP) generated in the VCL to generate the NAL unit. In here, the RBSP refers to the slice data, the parameter set, the SEI message, etc., generated in the VCL. The NAL unit header may include NAL unit type information specified according to RSRP data included in the corresponding NAL unit.

As illustrated in the figure above, the NAL unit may be classified into a VCL NAL unit and a non-VCL NAL unit according to the RSRP generated in the VCL. The VCL NAL unit may mean a NAL unit including information (slice data) on the information, and the non-VCL NAL unit may mean a NAL unit including information (parameter set or SEI message) required to decode the image.

The VCL NA unit and the non-VCL NAL unit may be transmitted through a network while header information is added according to a data standard of a sub system. For example, the NAL unit may be converted into a data format of a predetermined standard such as an H.266/VVC file format, a real-time transport protocol (RTP), a transport stream (TS), etc., and transported through various networks.

Further, as described above, in respect to the NAL unit, a NAL unit type may be specified according to an RBSP data structure included in the corresponding NAL unit, and information on the NAL unit type may be stored in a NAL unit header and signaled.

For example, the NAL unit may be classified into a VCL NAL unit type and a non-VCL NAL unit type according to whether the NAL unit includes information (slice data) on the image. Further, the VCL NAL unit type may be classified according to a property and a type of picture included in the VCL NAL unit and the non-VCL NAL unit may be classified according to the type of parameter set.

The following is an example of the NAL unit type specified according to the type of parameter set included in the non-VCL NAL unit type.

Adaptation Parameter Set (APS) NAL unit: Type for the NAL unit including the APS Video Parameter Set (VPS) NAL unit: Type for the NAL unit including the VPS Sequence Parameter Set (SPS) NAL unit: Type for the NAL unit including the SPS Picture Parameter Set (PPS) NAL unit: Type for the NAL unit including the PPS Decoding Capability Information (DCI) NAL unit: Type for the NAL unit including the DCI Picture header (PH) NAL unit: Type for the NAL unit including the PH The above-described NAL unit types have syntax information for the NAL unit type, and the syntax information may be stored in a NAL unit header and signaled. For example, the syntax information may be nal_unit_type, and NAL unit types may be specified with a nal_unit type value.

Meanwhile, as described above, one picture may include a plurality of slices, and one slice may include a slice header and slice data. In this case, one picture header may be further added to a plurality of slices (slice header and slice data set) in one picture. The picture header (picture header syntax) may include information/parameters commonly applicable to the picture. In this document, slices may be mixed or replaced with tile groups. Also, in this document, the slice header may be mixed or replaced with type group headers.

The slice header (slice header syntax, slice header information) may include information/parameters commonly applicable to the slice. The APS (APS Syntax) or PPS (PPS Syntax) may include information/parameters commonly applicable to one or more slices or pictures. The SPS (SPS Syntax) may include information/parameters commonly applicable to one or more sequences. The VPS (VPS syntax) may include information/parameters commonly applicable to multiple layers. The DCI (DCI syntax) may include information/parameters commonly applicable to overall video. The DCI may include information/parameters related to decoding capability. In this document, high level syntax (HLS) may include at least one of the APS syntax, PPS syntax, SPS syntax, VPS syntax, DCI syntax, picture header syntax, or slice header syntax.

In this document, image/video information encoded from an encoding apparatus to a decoding apparatus and signaled in the form of a bitstream includes not only intra-picture partitioning related information, intra/inter prediction information, residual information, in-loop filtering information, and the like, but also information included in the slice header, information included in the picture header, information included in the APS, information included in the PPS, information included in an SPS, information included in a VPS, and/or information included in a DCI. Also, the image/video information may further include NAL unit header information.

Meanwhile, when intra prediction is performed, correlation between samples may be used and a difference between an original block and a prediction block, that is, a residual may be obtained. The above-described transform and quantization may be applied to the residual, through this, spatial redundancy may be removed. Hereinafter, an encoding method and a decoding method using intra prediction will be described in detail.

Intra prediction refers to prediction that generates prediction samples for a current block based on reference samples outside the current block in a picture including the current block (hereinafter referred to as the current picture). Here, reference samples outside the current block may refer to samples positioned around the current block. When intra prediction is applied to the current block, neighboring reference samples to be used for intra prediction of the current block may be derived.

For example, when the size (width×height) of the current block is nW×nH, the neighboring reference samples of the current block may include a total of 2×nH samples including samples adjacent to the left boundary of the current block and samples neighboring to the bottom-left of the current block, a total of 2×nW samples including samples adjacent to the top boundary and samples neighboring to the top-right current block, and 1 sample adjacent to the top-left of the current block. Alternatively, the neighboring reference samples of the current block may include samples top neighboring samples in a plurality of columns and left neighboring samples in a plurality of rows. In addition, the neighboring reference samples of the current block may include a total of nH samples adjacent to the right boundary of the current block of size nW×nH, a total of nW samples adjacent to the bottom boundary of the current block of size nW×nH, and 1 sample neighboring to the bottom-right of the current block of size nW×nH.

However, some of the neighboring reference samples of the current block may not be decoded yet or may not be available. In this case, the decoding apparatus may configure neighboring reference samples to be used for prediction by substituting unavailable samples with available samples. Alternatively, neighboring reference samples to be used for prediction may be configured through interpolation of available samples.

When the neighboring reference samples are derived, (i) a prediction sample may be derived based on the average or interpolation of the neighboring reference samples of the current block, and (ii) a prediction sample may be derived based on a reference sample existing in a specific (prediction) direction with respect to the prediction sample among neighboring reference samples of the current block. Case (i) may be applied when the intra prediction mode is a non-directional mode or non-angular mode, and case (ii) may be applied when the intra prediction mode is a directional mode or an angular mode.

In addition, through interpolation between a first neighboring sample located in a prediction direction of the intra prediction mode of the current block based on the prediction sample of the current block among the neighboring reference samples and a second neighboring sample located in the opposite direction of the prediction direction, the prediction sample may be generated. The above case may be called linear interpolation intra prediction (LIP). Also, chroma prediction samples may be generated based on luma samples using a linear model. This case can be called LM mode.

In addition, a temporary prediction sample of the current block may be derived based on filtered neighboring reference samples, and at least one reference sample derived according to the intra prediction mode among the existing neighboring reference samples, that is, unfiltered neighboring reference samples, and the temporary prediction sample may be weighted-summed to derive the prediction sample of the current block. The above case may be referred to as position dependent intra prediction (PDPC).

A reference sample line having the highest prediction accuracy among the neighboring multi-reference sample lines of the current block may be selected to derive the prediction sample by using the reference sample located in the prediction direction on the corresponding line, and then the reference sample line used herein may be indicated (signaled) to the decoding apparatus, thereby performing intra-prediction encoding. The above case may be referred to as multi-reference line (MRL) intra prediction or MRL based intra prediction.

In addition, intra prediction may be performed based on the same intra prediction mode by dividing the current block into vertical or horizontal subpartitions, and neighboring reference samples may be derived and used in the subpartition unit. That is, in this case, the intra prediction mode for the current block is equally applied to the subpartitions, and the intra prediction performance may be improved in some cases by deriving and using the neighboring reference samples in the subpartition unit. Such a prediction method may be called intra sub-partitions (ISP) or ISP based intra prediction.

The above-described intra prediction methods may be called an intra prediction type separately from the intra prediction mode. The intra prediction type may be called in various terms such as an intra prediction technique or an additional intra prediction mode. For example, the intra prediction type (or additional intra prediction mode) may include at least one of the above-described LIP, PDPC, MRL, or ISP. A general intra prediction method except for the specific intra prediction type such as LIP, PDPC, MRL, or ISP may be called a normal intra prediction type. The normal intra prediction type may be generally applied when the specific intra prediction type is not applied, and prediction may be performed based on the intra prediction mode described above. Meanwhile, post-filtering may be performed on the predicted sample derived as needed.

Meanwhile, in addition to the above-described intra prediction types, matrix based intra prediction (MIP) may be used as one method for intra prediction. MIP may be referred to as affine linear weighted intra prediction (ALWIP) or matrix weighted intra prediction (MIP).

If the MIP is applied to the current block, i) using neighboring reference samples on which an averaging process has been performed, ii) matrix-vector-multiplication process is performed, and iii) a horizontal/vertical interpolation process may be further performed to derive prediction samples for the current block as necessary. The intra prediction modes used for the MIP may be configured to be different from the intra prediction modes used in the LIP, PDPC, MRL, ISP intra prediction or normal intra prediction.

The intra prediction mode for MIP may be called "affine linear weighted intra prediction mode" or matrix-based intra prediction mode. For example, a matrix and an offset used in matrix vector multiplication may be set differently according to the intra prediction mode for the MIP. Here, the matrix may be referred to as an (affine) weight matrix, and the offset may be referred to as an (affine) offset vector or an (affine) bias vector. In this document, intra prediction mode for MIP may be called MIP intra prediction mode, linear weighted intra prediction mode, matrix weighted intra prediction mode, or matrix based intra prediction mode. A specific MIP method will be described later.

The following drawings are prepared to explain specific examples of this document. Since the names of specific devices or specific terms or names (eg, names of syntaxes) described in the drawings are provided as examples, the technical features of this document are not limited to the specific names used in the drawings below.

Figure 5:
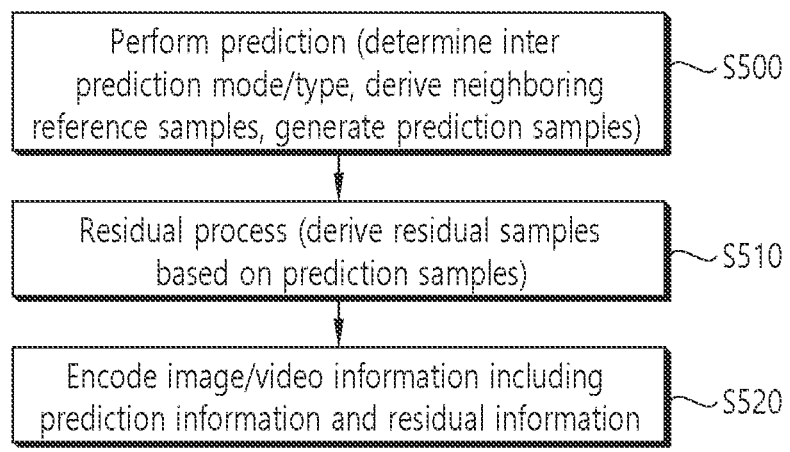
FIG. 5 schematically illustrates an example of an image encoding method based on intra prediction to which embodiments of the present disclosure may be applied.
Figure 6:
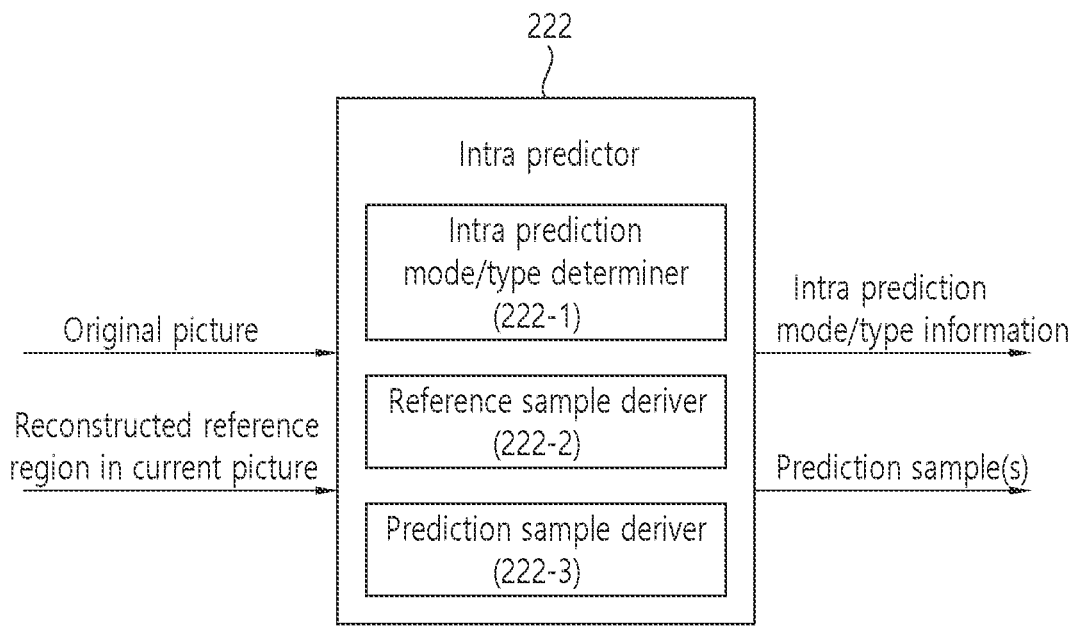
FIG. 6 schematically illustrates an intra predictor in an encoding apparatus.

FIG. 5 schematically illustrates an example of an image encoding method based on intra prediction to which embodiments of the present disclosure may be applied, and FIG. 6 schematically illustrates an intra predictor in an encoding apparatus. The intra predictor in the encoding apparatus of FIG. 6 may be applied to the same or corresponding to the intra predictor 222 of the encoding apparatus 200 of FIG. 2 described above.

Referring to FIGS. 5 and 6, S500 may be performed by the intra predictor 222 of the encoding apparatus, and S510 may be performed by the residual processor 230 of the encoding apparatus. Specifically, S510 may be performed by the subtractor 231 of the encoding apparatus. In S520, prediction information may be derived by the intra predictor 222 and encoded by the entropy encoder 240. In S520, residual information may be derived by the residual processor 230 and encoded by the entropy encoder 240. The residual information is information about residual samples. The residual information may include information about quantized transform coefficients of residual samples. As described above, the residual samples may be derived as transform coefficients through a transformer of the encoding apparatus, and the transform coefficients may be derived as quantized transform coefficients through a quantizer. Information about quantized transform coefficients may be encoded in the entropy encoder 240 through a residual coding process.

The encoding apparatus performs intra prediction on the current block (S500). The encoding apparatus may derive an intra prediction mode/type for the current block, derive neighboring reference samples of the current block, and generate prediction samples within the current block based on the intra prediction mode/type and the neighboring reference samples. Here, intra prediction mode/type determination, neighboring reference samples derivation, and prediction samples generation process may be performed simultaneously, or one process may be performed prior to another process.

For example, the intra predictor 222 of the encoding apparatus may include an intra prediction mode/type determiner 222-1, a reference sample deriver 222-2, and a prediction sample deriver 222-3. The intra prediction mode/type determiner 222-1 determines the intra prediction mode/type for the current block, the reference sample deriver 222-2 derives neighboring reference samples of the current block, and the prediction sample deriver 222-3 may derive prediction samples of the current block. Meanwhile, although not shown, when a prediction sample filtering process is performed, the intra predictor 222 may further include a prediction sample filtering (not shown). The encoding apparatus may determine a mode/type applied to the current block from among a plurality of intra prediction modes/types. The encoding apparatus may compare RD costs for intra prediction modes/types and determine an optimal intra prediction mode/type for the current block.

As described above, the encoding apparatus may perform a prediction sample filtering process. Prediction sample filtering may be referred to as post filtering. Some or all of the prediction samples may be filtered through the prediction sample filtering process. In some cases, the prediction sample filtering process may be omitted.

The encoding apparatus generates residual samples for the current block based on the (filtered) prediction samples (S510). The encoding apparatus may compare prediction samples from original samples of the current block based on phase and derive residual samples.

The encoding apparatus may encode image information including intra prediction information (prediction information) and residual information about residual samples (S520). Prediction information may include intra prediction mode information and intra prediction type information. Residual information may include residual coding syntax. The encoding apparatus may transform/quantize the residual samples to derive quantized transform coefficients. The residual information may include information about the quantized transform coefficients.

The encoding apparatus may output encoded image information in the form of a bitstream. The output bitstream may be delivered to a decoding apparatus through a storage medium or network.

As described above, the encoding apparatus may generate a reconstructed picture (including reconstructed samples and a reconstructed block). To this end, the encoding apparatus may derive (modified) residual samples by dequantizing/inverse transforming the quantized transform coefficients again. The reason for performing dequantization/inverse transformation after transforming/quantizing the residual samples in this way is to derive the same residual samples as the residual samples derived from the decoding apparatus as described above. The encoding apparatus may generate a reconstructed block including reconstructed samples for the current block based on prediction samples and (modified) residual samples. A reconstructed picture for a current picture may be generated based on the reconstructed block. As described above, an in-loop filtering process or the like may be further applied to the reconstructed picture.

Figure 7:
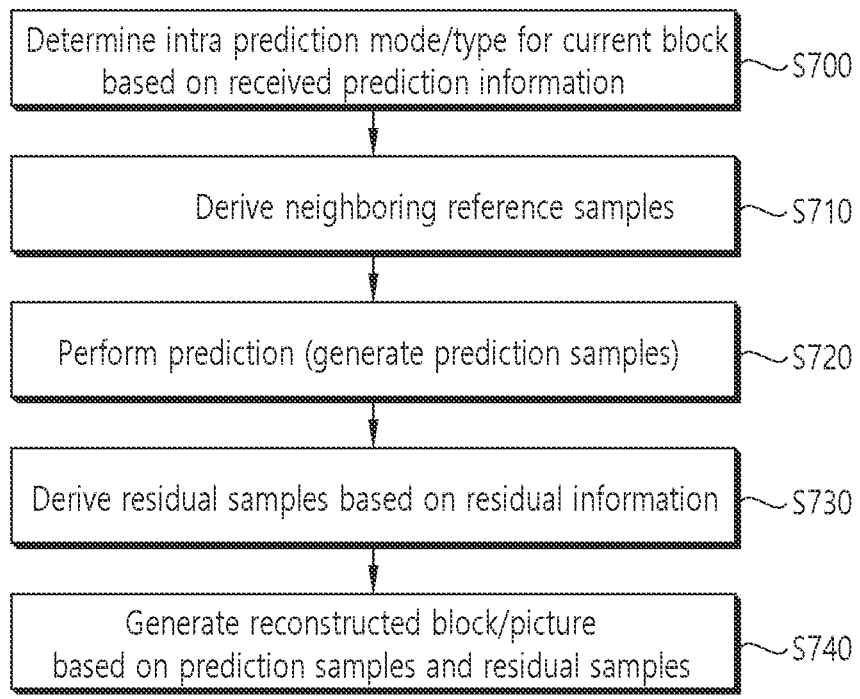
FIG. 7 schematically illustrates an example of an image decoding method based on intra prediction to which embodiments of the present disclosure may be applied.
Figure 8:
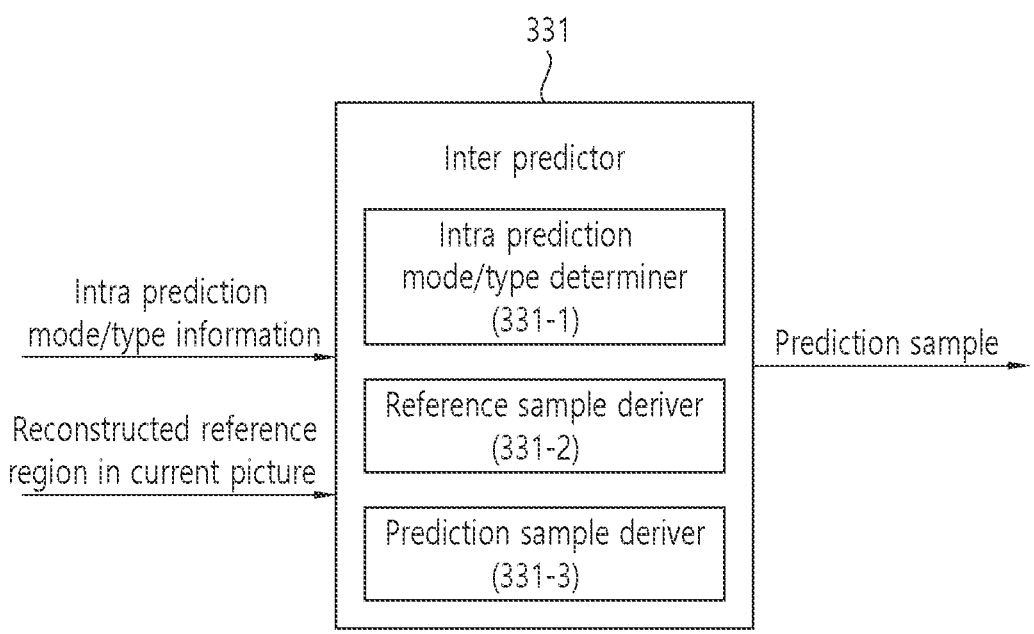
FIG. 8 schematically illustrates an intra predictor in a decoding apparatus.

FIG. 7 schematically illustrates an example of an image decoding method based on intra prediction to which embodiments of the present disclosure may be applied, and FIG. 8 schematically illustrates an intra predictor in a decoding apparatus. The intra predictor in the decoding apparatus of FIG. 8 may be applied to the same or corresponding to the above-described intra predictor 331 of the decoding apparatus 300 of FIG. 3.

Referring to FIGS. 7 and 8, the decoding apparatus may perform an operation corresponding to the operation performed by the above-described encoding apparatus. S700 to S720 may be performed by the intra predictor 331 of the decoding apparatus, and the prediction information of S700 and the residual information of S730 may be obtained from the bitstream by the entropy decoder 310 of the decoding apparatus. The residual processor 320 of the decoding apparatus may derive residual samples for the current block based on the residual information Specifically, the dequantizer 321 of the residual processor 320 derives transform coefficients by performing dequantization based on the quantized transform coefficients derived based on the residual information, and the inverse transformer of the residual processor 322 may derive residual samples for the current block by performing an inverse transform on the transform coefficients. S740 may be performed by the adder 340 or a reconstructor of the decoding apparatus.

The decoding apparatus may derive an intra prediction mode/type for the current block based on the received prediction information (intra prediction mode/type information)(S700). The decoding apparatus may derive neighboring reference samples of the current block (S710). The decoding apparatus generates prediction samples within the current block based on the intra prediction mode/type and neighboring reference samples (S720). In this case, the decoding apparatus may perform a prediction sample filtering process. Prediction sample filtering may be referred to as post filtering. Some or all of the prediction samples may be filtered through the prediction sample filtering process. In some cases, the prediction sample filtering process may be omitted.

The decoding apparatus generates residual samples for the current block based on the received residual information (S730). The decoding apparatus may generate reconstructed samples for the current block based on the prediction samples and residual samples, and derive a reconstructed block including the reconstructed samples (S740). A reconstructed picture for a current picture may be generated based on the reconstructed block. As described above, an in-loop filtering process or the like may be further applied to the reconstructed picture.

Here, the intra predictor 331 of the decoding apparatus may include an intra prediction mode/type determiner 231-1, a reference sample deriver 331-2, and a prediction sample deriver 331-3. The intra prediction mode/type determiner 331-1 determines the intra prediction mode/type of the current block based on the intra prediction mode/type information obtained from the entropy decoder 310, and the reference sample deriver 331-2) may derive neighboring reference samples of the current block, and the prediction sample deriver 331-3 may derive prediction samples of the current block. Meanwhile, although not shown, when the above-described prediction sample filtering process is performed, the intra prediction unit 331 may further include a prediction sample filter (not shown).

The intra prediction mode information may include, for example, flag information (ex. intra_luma_mpm_flag) indicating whether the most probable mode (MPM) or remaining mode is applied to the current block. In this case, when MPM is applied to the current block, the prediction mode information may further include index information (ex. intra_luma_mpm_idx) indicating one of intra prediction mode candidates (MPM candidates). Intra prediction mode candidates (MPM candidates) may be composed of an MPM candidate list or an MPM list. In addition, when MPM is not applied to the current block, the intra prediction mode information may further include remaining mode information (ex. intra_luma_mpm_remainder) indicating one of intra prediction modes other than intra prediction mode candidates (MPM candidates). there is. The decoding apparatus may determine the intra prediction mode of the current block based on the intra prediction mode information.

In addition, intra prediction type information may be implemented in various forms. For example, intra prediction type information may include intra prediction type index information indicating one of intra prediction types. As another example, the intra prediction type information includes at least one of reference sample line information (ex. intra_luma_ref_idx) indicating whether the MRL is applied to the current block and, if the MRL is applicable, whether a reference sample line is used or not, ISP flag information (ex. intra_subpartitions_mode_flag) indicating whether the ISP is applied to the current block, ISP type information (ex. intra_subpartitions_split_flag) in which subpartitions indicates a partition type when the ISP is applied, flag information indicating whether PDCP is applied, or flag information whether LIP is applied. In addition, the intra prediction type information may include a MIP flag information indicating whether MIP is applied to the current block.

The aforementioned intra prediction mode information and/or intra prediction type information may be encoded/decoded through the coding method described in this document. For example, the aforementioned intra prediction mode information and/or intra prediction type information may be encoded/decoded through entropy coding (eg. CABAC, CAVLC) coding based on truncated (rice) binary code.

Figure 9:
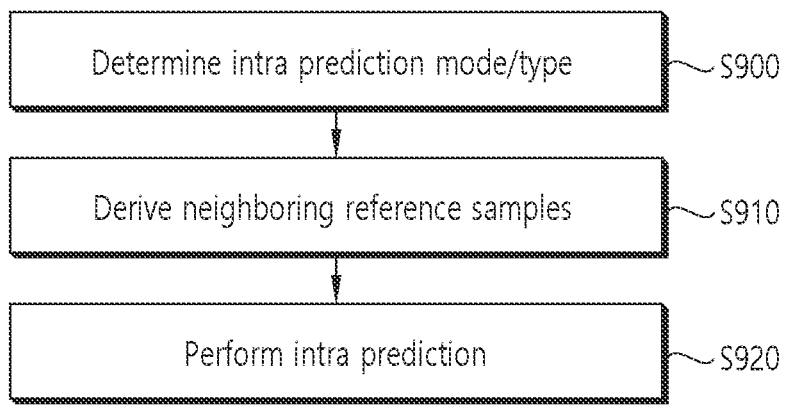
FIG. 9 exemplarily illustrates a schematic intra prediction process to which embodiments of the present disclosure may be applied.

FIG. 9 exemplarily illustrates a schematic intra prediction process to which embodiments of the present disclosure may be applied.

Referring to FIG. 9, as described above, the intra prediction process may include determining an intra prediction mode/type, deriving neighboring reference samples, and performing intra prediction (generating prediction samples). The intra prediction process may be performed in the encoding apparatus and the decoding apparatus as described above. A coding apparatus in this document may include an encoding apparatus and/or a decoding apparatus.

The coding apparatus may determine an intra prediction mode/type (S900).

The encoding apparatus may determine an intra prediction mode/type applied to the current block among various intra prediction modes/types described above and generate prediction-related information. The prediction related information may include intra prediction mode information indicating an intra prediction mode applied to the current block and/or intra prediction type information indicating an intra prediction type applied to the current block. The decoding apparatus may determine an intra prediction mode/type applied to the current block based on the prediction related information.

As described above, the intra prediction mode information may include at least one of MPM flag information, non-planar flag information. MPM index information, and/ or remaining mode (MPM reminder) information. As described above, the intra prediction type information includes reference sample line (MRL index) information (ex. intra_luma_ref_idx), ISP flag information (ex. intra_subpartitions_mode_flag), ISP type information (ex. intra_subpartitions_split_flag), and flag information indicating whether PDCP is applied or not, flag information indicating whether LIP is applied and/or MIP flag information.

For example, when intra prediction is applied, the intra prediction mode applied to the current block may be determined using the intra prediction modes of neighboring blocks. For example, the coding apparatus may select one of MPM candidates in a most probable mode (MPM) list derived based on an intra prediction mode and/or additional candidate modes of a neighboring block (eg, a left and/or upper neighboring block) of a current block, based on the received MPM index, or may select one of the remaining intra prediction modes not included in the MPM candidates (and planar mode) based on MPM reminder information (remaining intra prediction mode information). The MPM list may be configured to include or not include a planar mode as a candidate. For example, if the mpm list includes the planar mode as a candidate, the MPM list may have 6 candidates, and if the MPM list does not include the planar mode as a candidate, the mpm list may have 5 candidates. When the MPM list does not include a planar mode as a candidate, a non-planar flag (ex. intra_luma_not_planar_flag) indicating whether the intra prediction mode of the current block is not a planar mode may be signaled. For example, the MPM flag may be signaled first, and the MPM index and non-planar flag may be signaled when the value of the MPM flag is 1. Also, the MPM index may be signaled when the value of the non-planar flag is 1. Here, the reason why the MPM list is configured not to include the planar mode as a candidate is that the planar mode is not MPM, rather than that the planar mode is always considered as the MPM, so a not planar flag is first signaled. This is to check whether it is in planar mode first.

For example, whether the intra prediction mode applied to the current block is among MPM candidates (and planar mode) or remaining mode may be indicated based on an MPM flag (ex. intra_luma_mpm_flag). A value of 1 of the MPM flag may indicate that the intra prediction mode for the current block is within MPM candidates (and planar mode), and a value of 0 of the MPM flag may indicate that the intra prediction mode for the current block is not within MPM candidates (and planar mode). The not planar flag (ex. intra_luma_not_planar_flag) value 0 may indicate that the intra prediction mode of the current block is the planar mode, and the not planar flag value 1 may indicate that the intra prediction mode of the current block is not the planar mode. The MPM index may be signaled in the form of an mpm_idx or intra_luma_mpm_idx element, and the remaining intra prediction mode information may be signaled in the form of a rem_intra_luma_pred_mode or intra_luma_mpm_remainder syntax element. For example, the remaining intra prediction mode information may indicate one of all intra prediction modes by indexing remaining intra prediction modes not included in the MPM candidates (and planar mode) in order of prediction mode numbers. The intra prediction mode may be an intra prediction mode for a luma component (sample). Hereinafter, the intra prediction mode information includes at least one of the MPM flag (ex. intra_luma_mpm_flag), the not planar flag (ex. intra_luma_not_planar_flag), the MPM index (ex. mpm_idx or intra_luma_mpm_idx), and the remaining intra prediction mode information (rem_intra_luma_pred_mode or intra_luma_mpm_remainder). In this document, the MPM list may be called various terms such as MPM candidate list and candModeList.

When MIP is applied to the current block, a separate mpm flag (ex. intra_mip_mpm_flag), mpm index (ex. intra_mip_mpm_idx), and remaining intra prediction mode information (ex. intra_mip_mpm_remainder) for MIP may be signaled, and the not planar flag may not be signaled.

In other words, when an image is generally partitioned into blocks, the current block to be coded and neighboring blocks have similar image characteristics. Therefore, the current block and neighboring blocks are highly likely to have the same or similar intra prediction modes. Thus, the encoder can use the intra-prediction mode of the neighboring block to encode the intra-prediction mode of the current block.

A most probable modes (MPM) list for a current block of a coding apparatus may be configured. The MPM list may also be referred to as an MPM candidate list. Here, the MPM may mean a mode used to improve coding efficiency by considering the similarity between the current block and neighboring blocks during intra prediction mode coding. As described above, the MPM list may include the planar mode or may exclude the planar mode. For example, when the MPM list includes a planar mode, the number of candidates in the MPM list may be 6. And, when the MPM list does not include the planar mode, the number of candidates in the MPM list may be five.

The encoding apparatus may perform prediction based on various intra prediction modes, and may determine an optimal intra prediction mode based on rate-distortion optimization (RDO) based thereon. In this case, the encoding apparatus may determine the optimal intra prediction mode using only the MPM candidates and planar mode configured in the MPM list, or may further use the remaining intra-prediction modes as well as MPM candidates and planar modes configured in the MPM list. Specifically, if the intra prediction type of the current block is a specific type (eg, LIP, MRL, or ISP) rather than a normal intra prediction type, the encoding apparatus considers only the MPM candidates and planar mode as the intra prediction mode candidates for the current block, and then determines the optimal intra prediction mode. That is, in this case, the intra prediction mode for the current block may be determined only from among the MPM candidates and the planar mode, and in this case, the mpm flag may not be encoded/signaled. In this case, the decoding apparatus may estimate that the mpm flag is 1 without separately signaling the mpm flag.

Meanwhile, in general, when the intra prediction mode of the current block is not a planar mode and is one of MPM candidates in the MPM list, the encoding apparatus generates an mpm index (mpm idx) indicating one of the MPM candidates. If the intra prediction mode of the current block is not included in the MPM list, MPM remainder information (remaining intra prediction mode information) indicating the same mode as the intra prediction mode of the current block among the remaining intra prediction modes not included in the MPM list (and planar mode) is generating. The MPM reminder information may include, for example, an intra_luma_mpm_remainder syntax element.

The decoding apparatus obtains intra prediction mode information from the bitstream. As described above, the intra prediction mode information may include at least one of an MPM flag, a non-planar flag, an MPM index, or MPM reminder information (remaining intra prediction mode information). The decoding apparatus may construct an MPM list. The MPM list is configured identically to the MPM list configured in the encoding apparatus. That is, the MPM list may include intra prediction modes of neighboring blocks or may further include specific intra prediction modes according to a predetermined method.

The decoding apparatus may determine the intra prediction mode of the current block based on the MPM list and the intra prediction mode information. For example, when the value of the MPM flag is 1, the decoding apparatus derives a planar mode as an intra prediction mode of the current block (based on a not planar flag) or selects a candidate indicated by the MPM index from among MPM candidates in the MPM list. It can be derived as an intra prediction mode of the current block. Here, the MPM candidates may indicate only candidates included in the MPM list, or may include not only candidates included in the MPM list but also a planar mode that may be applied when the value of the MPM flag is 1.

As another example, when the value of the MPM flag is 0, the decoding apparatus may derive an intra prediction mode indicated by the remaining intra prediction mode information (which may be called mpm remainder information) among the remaining intra prediction modes not included in the MPM list and the planar mode as an intra prediction mode of the current block. Meanwhile, as another example, when the intra prediction type of the current block is a specific type (eg, LIP, MRL, or ISP), the decoding apparatus may derive the candidate indicated by the MPM flag in the planar mode or the MPM list as the intra prediction mode of the current block without parsing/decoding/confirming the MPM flag.

The coding device derives neighboring reference samples of the current block (S910). When intra prediction is applied to the current block, neighboring reference samples to be used for intra prediction of the current block may be derived. The neighboring reference samples of the current block include a total of 2×nH samples adjacent to the left boundary of the current block of size nW×nH and samples neighboring to the bottom-left of the current block of size nW×nH, and a total 2×nW samples adjacent to the top boundary of the current block and samples neighboring to the top-right of the current block of size nW×nH and 1 sample neighboring to the top-left of the current block. Alternatively, the neighboring reference samples of the current block may include samples top neighboring samples in a plurality of columns and left neighboring samples in a plurality of rows. In addition, the neighboring reference samples of the current block may include a total of nH samples adjacent to the right boundary of the current block of size nW×nH, a total of nW samples adjacent to the bottom boundary of the current block of size nW×nH, and 1 sample neighboring to the bottom-right of the current block of size nW×nH.

Meanwhile, when MRL is applied (ie, when the value of the MRL index is greater than 0), the neighboring reference samples may be located on lines 1 to 2 instead of line 0 adjacent to the current block on the left/upper side. In this case, the number of neighboring reference samples may be further increased. Meanwhile, when ISP is applied, the neighboring reference samples may be derived in units of sub-partitions.

The coding apparatus derives prediction samples by performing intra prediction on the current block (S920). The coding apparatus may derive the prediction samples based on the intra prediction mode/type and the neighboring samples. The coding apparatus may derive a reference sample according to an intra prediction mode of the current block among neighboring reference samples of the current block, and may derive a prediction sample of the current block based on the reference sample.

Meanwhile, when intra prediction is applied, an intra prediction mode applied to the current block may be determined using intra prediction modes of neighboring blocks. For example, the decoding apparatus may select one of mpm candidates in a most probable mode (mpm) list list derived based on an intra prediction mode of a neighboring block (eg, a left and/or an upper neighboring block) of a current block and additional candidate modes, based on received mpm index, or may select one of the remaining intra prediction modes not included in the mpm candidates (and planar mode) based on the remaining intra prediction mode information. The mpm list can be configured to include or not include planar modes as candidates. For example, if the mpm list includes the planar mode as a candidate, the mpm list may have 6 candidates, and if the mpm list does not include the planar mode as a candidate, the mpm list may have 5 candidates. If the mpm list does not include a planar mode as a candidate, a non-planar flag (ex. intra_luma_not_planar_flag) indicating whether the intra prediction mode of the current block is not a planar mode may be signaled. For example, the mpm flag may be signaled first, and the mpm index and non-planar flag may be signaled when the value of the mpm flag is 1. Also, the mpm index may be signaled when the value of the non-planar flag is 1. Here, the fact that the mpm list is configured not to include the planar mode as a candidate is not that the planar mode is not mpm, but rather that the planar mode is always considered as mpm, so a not planar flag is first signaled to determine whether the planar mode is the planar mode. to check first.

For example, whether the intra prediction mode applied to the current block is among mpm candidates (and planar mode) or remaining mode may be indicated based on an mpm flag (ex. intra_luma_mpm_flag). A value of mpm flag 1 may indicate that the intra prediction mode for the current block is within mpm candidates (and planar mode), and a value of mpm flag 0 may indicate that the intra prediction mode for the current block is not within mpm candidates (and planar mode). A value of not planar flag (ex. intra_luma_not_planar_flag) 0 may indicate that the intra prediction mode of the current block is the planar mode, and a value of not planar flag 1 may indicate that the intra prediction mode of the current block is not the planar mode. The mpm index may be signaled in the form of an mpm_idx or intra_luma_mpm_idx syntax element, and the remaining intra prediction mode information may be signaled in the form of a rem_intra_luma_pred_mode or intra_luma_mpm_remainder syntax element. For example, the remaining intra prediction mode information may indicate one of all intra prediction modes by indexing remaining intra prediction modes not included in mpm candidates (and planar mode) in order of prediction mode number. The intra prediction mode may be an intra prediction mode for a luma component (sample). Hereinafter, intra prediction mode information may include at least one of mpm flag (ex. intra_luma_mpm_flag), not planar flag (ex. intra_luma_not_planar_flag), mpm index (ex. mpm_idx or intra_luma_mpm_idx), or remaining intra prediction mode information (rem_intra_luma_pred_mode or intra_luma_mpm_remainder). In this document, the mpm list may be called various terms such as an mpm candidate list, a candidate mode list (candModeList), and a candidate intra prediction mode list.

Figure 10:
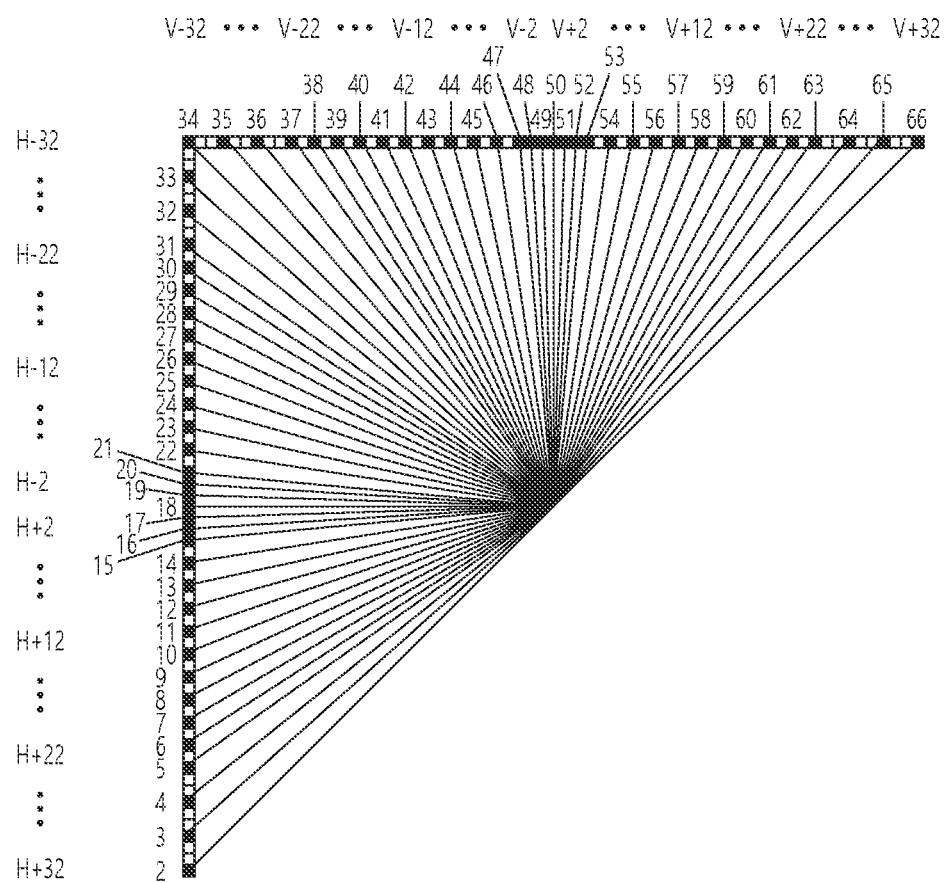
FIG. 10 illustrates an example of intra prediction modes to which embodiments of the present disclosure may be applied.

FIG. 10 illustrates an example of intra prediction modes to which embodiments of the present disclosure may be applied.

Referring to FIG. 10, an intra prediction mode with horizontal direction and an intra prediction mode with vertical direction can be distinguished around intra prediction mode no. 34 with a upward-left diagonal prediction direction. H and V of FIG. 8 refer to horizontal and vertical directions, respectively, and numbers −32 to 32 represent displacements of 1/32 units on a sample grid position. Intra prediction modes 2 to 33 have horizontal directionality, and intra prediction modes 34 to 66 have vertical directionality. The 18th and 50th intra prediction modes represent horizontal intra prediction modes and vertical intra prediction modes, respectively, while the 2nd intra prediction mode is called the downward-left diagonal intra prediction mode, and the 34th intra prediction mode may be referred to as an upper-left diagonal intra prediction mode, and the 66th intra prediction mode may be referred to as an upper-left diagonal intra prediction mode.

Hereinafter, a Decoder Side Intra Mode Derivation (DIMD) mode, which is a method of intra prediction, will be described.

For example, DIMD modes include Decoder Side Intra Mode Derivation mode, Decoder Intra Mode Derivation mode, Decoder Side Intra Prediction Mode, and Decoder Intra Mode Prediction mode. (Decoder Intra Prediction Mode).

Also, for example, the DIMD mode may be referred to as a DIMD intra mode. Also, the DIMD mode may be referred to as a DIMD intra prediction mode or a DIMD prediction mode.

Also, for example, intra mode may be referred to as intra prediction mode in this document. In addition, intra mode and intra prediction mode may be used interchangeably.

Meanwhile, in existing video codecs such as HEVC and VVC, an intra prediction mode is signaled through a bitstream. The amount of overhead of the intra prediction mode may vary depending on several factors (ie quantization parameters, video characteristics, etc.). Table 1 below shows overhead in intra prediction mode.

this trend can be observed regardless of the video standard. Also, this trend suggests that the overhead of intra mode signaling is non-negligible.

Meanwhile, unlike the above-described conventional intra prediction mode signaling, a decoder side intra mode derivation (DIMD) method is introduced in this document. Here, DIMD means an intra coding tool in which a luma intra prediction mode (IPM) is not transmitted through a bitstream. Instead, the luma intra prediction mode is derived using previously encoded/decoded pixels in both the encoder and decoder. The DIMD introduces a new intra prediction mode that points to one of the existing intra prediction modes.

For example, the DIMD mode is selected as the best mode in the encoder when the corresponding RD cost is the minimum among all other intra modes. In the decoder, each CU may check whether the DIMD mode is applied. For example, DIMD flag information may be signaled to indicate the DIMD mode. In addition, it may indicate whether the CU derives the DIMD intra mode by another method.

When a CU is coded with DIMD mode, the decoder can derive DIMD intra mode. For example, the DIMD intra mode (or DIMD mode) may be derived during a reconstruction process using previously decoded neighboring pixels. Also, the DIMD mode may be derived using other techniques or other processes.

If the DIMD mode is not selected in the decoder, information about the intra mode that can be parsed from the bitstream may be about the existing intra mode. That is, the intra prediction mode can be parsed through the existing intra prediction mode method. For example, the information about the intra mode may be at least one of an MPM flag, an MPM index, or remaining mode information.

Figure 11:
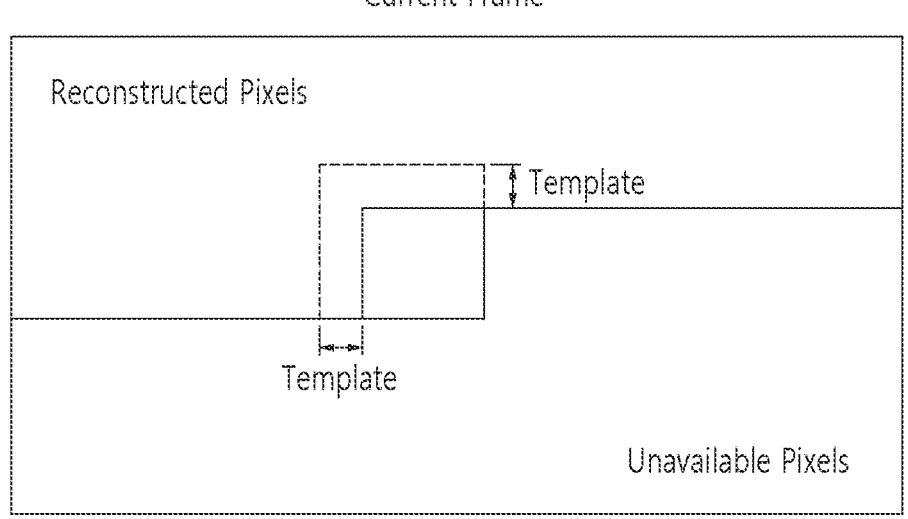
FIG. 11 exemplarily illustrates a reconstructed pixel template.

FIG. 11 exemplarily illustrates a reconstructed pixel template.

Referring to FIG. 11, a DIMD mode for a current CU may be derived using a reconstructed pixel template. For example, the DIMD mode may be derived by calculating direction information between reconstructed pixels assum-

TABLE 1

| QP | % of bits used to code INTRA_DIR_ANG_Bit | | Division of the % of bits used for Angular Direction | |
|---|---|---|---|---|
| QP22 | INTRA_DIR_ANG_Bit | 4.87% | INTRA_DIR_MPM_FLAG Bit | 0.74% |
| | | | INTRA_DIR_LUMA_MPM Bit | 1.61% |
| | | | INTRA_DIR_LUMA_NON_MPM Bit | 1.41% |
| | | | INTRA_DIR_CHROMA Bit | 3.11% |
| QP27 | INTRA_DIR_ANG_Bit | 7.19% | INTRA_DIR_MPM_FLAG Bit | 1.16% |
| | | | INTRA_DIR_LUMA_MPM Bit | 2.49% |
| | | | INTRA_DIR_LUMA_NON_MPM Bit | 2.17% |
| | | | INTRA_DIR_CHROMA Bit | 1.37% |
| QP32 | INTRA_DIR_ANG_Bit | 9.22% | INTRA_DIR_MPM_FLAG Bit | 1.55% |
| | | | INTRA_DIR_LUMA_MPM Bit | 3.24% |
| | | | INTRA_DIR_LUMA_NON_MPM Bit | 2.89% |
| | | | INTRA_DIR_CHROMA Bit | 1.54% |
| QP37 | INTRA_DIR_ANG_Bit | 11.37% | INTRA_DIR_MPM_FLAG Bit | 1.93% |
| | | | INTRA_DIR_LUMA_MPM Bit | 3.91% |
| | | | INTRA_DIR_LUMA_NON_MPM Bit | 3.57% |
| | | | INTRA_DIR_CHROMA Bit | 1.96% |
| Average | INTRA_DIR_ANG_Bit | 8.16% | INTRA_DIR_MPM_FLAG Bit | 1.35% |
| | | | INTRA_DIR_LUMA_MPM Bit | 2.81% |
| | | | INTRA_DIR_LUMA_NON_MPM Bit | 2.51% |
| | | | INTRA_DIR_CHROMA_Bit | 1.49% |

Referring to Table 1, on average, about 8.15% of bits are used to code the intra prediction mode. Although this represents a statistic derived from the VVC reference software VTM version 10, it should be taken into account that ing that the angular direction of the template is highly correlated with the direction of the current block.

For example, the amount of gradients can be used to measure the DIMD mode. In this case, the amount of the gradient may be represented by a histogram. For example, the DIMD mode can be estimated based on intensity and orientation that can be calculated from adjacent reconstructed pixels of the current block. In this case, the intensity may be indicated by G, and the direction may be indicated by O. In this case, the intensity may mean amplitude.

Meanwhile, the Sobel filter may also be called a Sobel operator, and is an efficient filter for edge detection. When using a Sobel filter, there are two types of Sobel filters available: a Sobel filter for vertical direction and a Sobel filter for horizontal direction.

For example, for each pixel in the template, Sobel filters use the window centered at the current pixel to calculate x (i.e., Mx) and y (That is, it can be applied in My) direction.

The Mx and the My can be calculated through the following equation.

$$M_x = \begin{bmatrix} -1 & 0 & 1 \\ -2 & 0 & 2 \\ -1 & 0 & 1 \end{bmatrix} \text{ and } M_y = \begin{bmatrix} -1 & -2 & -1 \\ 0 & 0 & 0 \\ 1 & 2 & 1 \end{bmatrix} \quad \text{[Equation 1]}$$

In addition, the amplitude and the direction can be calculated through the following equation.

$$G = |G_x| + |G_y| \text{ and } O = \text{atan}\left(\frac{G_y}{G_x}\right) \quad \text{[Equation 2]}$$

The direction of the gradient can be converted to intra-angular prediction mode. For example, the directional intra mode considered in ECM 1.-0 may be 67 mode as in VVC. When DIMD mode is applied, two intra modes can be derived from surrounding reconstruction samples based on Hog (Histogram of Gradients). The Hog analysis can generate two intra modes corresponding to the highest cumulative histogram amplitude and the second highest cumulative histogram amplitude. The final prediction can be calculated by blending the predictions of the two intra modes and the planar mode. For example, the planner prediction may be assigned a ⅓ weight, and the remaining ⅔ may be distributed to the first and second modes in proportion to the Hog amplitude. In other words, a ⅔ weight may be distributed in proportion to the Hog amplitude to the first intra mode corresponding to the highest cumulative histogram amplitude and the second mode corresponding to the second highest cumulative histogram amplitude.

Below, the specification looks at the TIMD (Template-based Intra Mode Derivation, TIMD) mode, which is a method of intra prediction.

For example, TIMD mode may be called template-based Intra Mode Derivation mode, Template Intra Mode Derivation mode, etc.

Also, for example, TIMD mode may be called TIMD intra mode. Additionally, TIMD mode may be called TIMD intra prediction mode or TIMD prediction mode.

Figure 12:
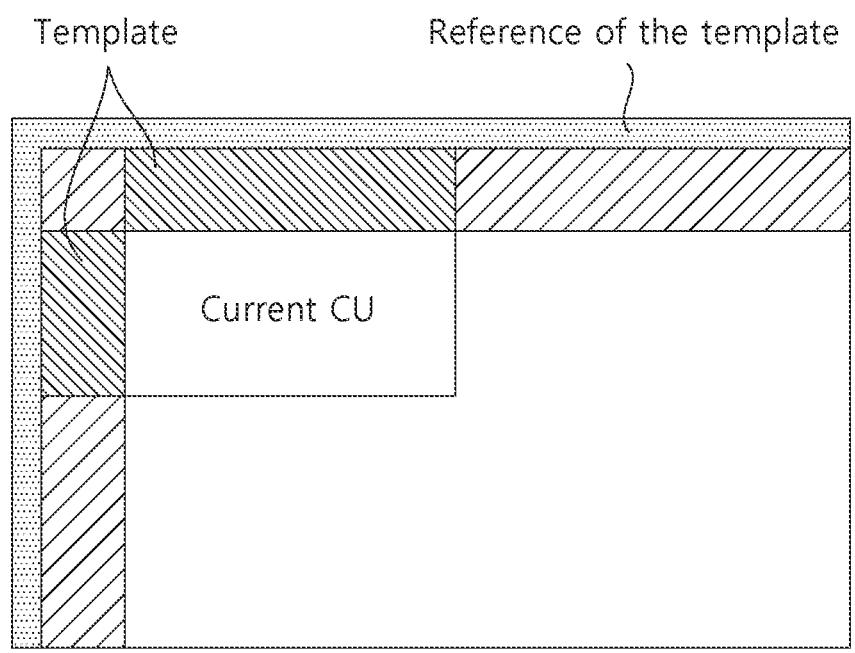
FIG. 12 exemplarily shows the template used to derive the intra prediction mode for the TIMD mode.

FIG. 12 exemplarily shows the template used to derive the intra prediction mode for the TIMD mode.

When TIMD mode is used, the decoder can derive the intra mode of the current CU using previously decoded surrounding pixels. For example, prediction samples for the surrounding template are derived based on the surrounding reference samples of the surrounding template of the current block (or current CU), by comparing prediction samples for the derived surrounding template with restored samplelets of the surrounding template, the intra mode of the current block (or current CU) can be derived. Specifically, after deriving the SATD (Sum of Absolute Transformed Difference) of the prediction sample derived based on the surrounding reference samples of the surrounding template and the restored sample of the surrounding template, the mode with the minimum SATD can be selected as the intra mode of the current block.

For example, referring to FIG. 12, prediction samples of the template can be derived based on surrounding reference samples located outside the template, that is, Reference of the template. After deriving the SATD between the predicted sample of the derived template and the restored sample of the template already derived during the restoration process, the mode with the minimum SATD can be selected as the intra mode of the current block. Since the template is an area where restoration has already been completed in the decoding order, this method can be used.

The TIMD can be used in intra prediction. TIMD is a decoder-side intra prediction mode derivation method that uses a template-based method in both the encoder and decoder. Similar to DIMD described above, TIMD intra mode is not signaled to the decoder. At this time, similar to DIMD, the TIMD mode for the current CU can be derived using the restored pixel template. To generate prediction samples of the template, reference samples of the template for each candidate mode may be generated. The cost can be calculated as the Sum of Absolute Transformed Differences (SATD) between the predicted and restored samples of the template. At this time, the intra prediction mode corresponding to the minimum cost among the costs calculated by SATD may be selected as the TIMD mode. At this time, the number of intra modes may be 67. Additionally, the number of intra modes can be expanded to 131 prediction modes.

Additionally, a flag that enables or disables the proposed method may be signaled in the SPS. For example, if the flag is true, a CU level flag indicating whether the proposed TIMD method is used may be signaled. At this time, the flag indicating whether the TIMD method is used may be called a TIMD flag. For example, when the TIMD flag is enabled, the remaining syntax elements related to the luma intra prediction mode including MRL and ISP related information may be skipped.

Meanwhile, the basic structure of TIMD can be extended to incorporate a fusion mode. At this time, the two modes with the lowest SATD cost can be used to fuse together with the weight to be used as weighted intra prediction for the current CU. The costs of the two selected modes are compared to a threshold, and in testing, a cost coefficient of 2 can be applied as shown in the equation below.

$$\text{costMode2} < 2 * \text{costMode1} \quad \text{[Equation 3]}$$

[Equation 4]

For example, if Equation 3 above is true, fusion is applied, otherwise only one mode is used. At this time, the one mode may be mode 1.

Additionally, the weights for the modes can be calculated from the SATD cost using the equation below.

$$\text{weight1} = \text{costMode2}/(\text{costMode1} + \text{costMode2})$$

$$\text{weight2} = 1 - \text{weight1}$$

Here, costMode 1 may be the SATD cost of mode 1, and costMode 2 may be the SATD cost of mode 2.

Below, the specification looks at CIIP (Combined Inter Intra Prediction, CIIP), one of the prediction methods.

In VVC, if a CU is coded in merge mode, the CU contains at least 64 luma samples, and if CU Width and CU Height are less than 128 luma samples, an additional flag may be signaled indicating whether combined inter intra prediction (CIIP) is applied to the current CU. For example, if CU width×CU height is greater than or equal to 64, and CU width and CU height are less than 128 luma samples, an additional flag may be signaled indicating whether CUIP applies to the current CU.

CIIP prediction performs prediction by combining inter prediction signals and intra prediction signals. Pinter, an Int prediction signal in CIIP mode, can be derived using the same Inter prediction process applied to regular merge mode. Additionally, Pintra, an intra prediction signal, can be derived according to a regular intra prediction process using planar mode. int FIG. 13 exemplarily shows neighboring blocks used to derive weight values used in CIIP.

Figure 13:
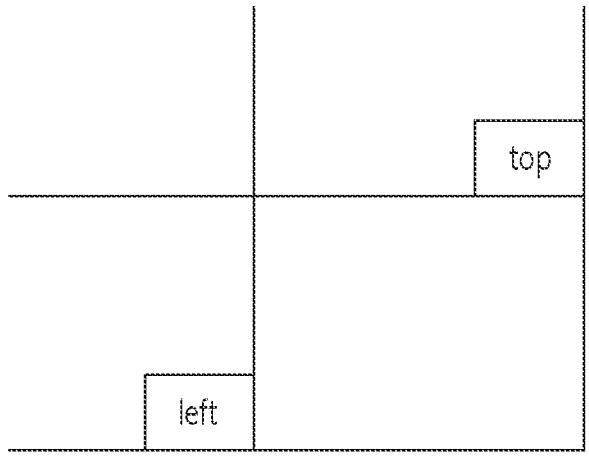
FIG. 13 exemplarily shows neighboring blocks used to derive weight values used in CIIP.

In CIIP, intra prediction signals and inter prediction signals can be combined using weighted average, referring to FIG. 13, the weight value used in the weighted average can be calculated according to the coding modes of the upper and left neighboring blocks of the current block, this can be calculated as follows.

If the upper surrounding block is available and intra-coded, isIntraTop is set to 1. Otherwise, isIntraTop is set to 0.
If the left surrounding block is available and intra-coded, isIntraLeft is set to 1: otherwise, isIntraLeft is set to 0.
If isIntraLeft+isIntraTop=2, wt is set to 3.
Otherwise, if isIntraLeft+isIntraTop=1, st is set to 2.
Otherwise, wt is set to 1.
Additionally, CIIP prediction can be calculated using the equation below.

$$P_{CIIP} = ((4 - wt) * P_{inter} + wt * P_{intra} + 2) \gg 2 \quad \text{[Equation 5]}$$

Here, PCIIP represents the CIIP prediction signal, Pinter represents the inter prediction signal, and $P_{intra}$ represents the intra prediction signal. Additionally, wt can be determined based on the availability of the upper and left neighboring blocks and whether intra coding is performed according to the method described above.

The following table is an example syntax of merge data in CIIP.

According to Table 2, the CIIP flag may be included in merge data. This may represent the process in which the CIIP flag is parsed when the CU is decoded in the decoder.

Meanwhile, to improve the performance of the intra coding structure, the following aspects discussed below can be considered. Each embodiment item can be applied individually or in combination.

For example, intra modes can be used, which can be derived using DIMD and/or TIMD algorithms.

As an example, if the intra mode is derived using a combination of DIMD/TIMD and/or other techniques, it is possible to use one mode or multiple modes to calculate the CIIP prediction. For example, if multiple derived intra modes are used to calculate the CIP prediction, it is possible to assign equal or unequal weights to the derived intra modes.

Additionally, multiple inter modes may be used, for example when used to calculate a CIIP prediction. At this time, similar to assigning weights to multiple derived intra modes, it is possible to assign identical or non-identical weights to multiple inter modes.

As another example, when using a combination of multiple inter and/or intra modes to determine CIIP prediction, it may be possible to use a pre-determined rule.

For example, if neighboring blocks are available, the CIP prediction can be determined based on how many neighboring blocks are available and which neighboring blocks are available. In other words, the CIIP prediction can be determined based on the number of available neighboring blocks and the available neighboring blocks. Specifically, CIP prediction can be determined based on whether the neighboring block is an upper neighboring block, a left neighboring block, or an upper left neighboring block.

Meanwhile, the case that serves as the basis for block statistics may mean a case in which a combination of intra-mode and inter-mode can be used so that the variance of the luma pixel value can be captured by the combination.

Or, as another example, it may be possible to check one derived mode or multiple derived modes to determine which mode(s) can be used using predetermined rate distortion (RD) optimization.

For example, the derived modes can be added to the RD calculation process, and the mode corresponding to the lowest RD cost can be used to generate a prediction. That is, the mode with the lowest RD cost among the derived modes can be used to generate the prediction sample. At this time, the RD mode may be full-RD optimization. Alternatively, FastRDO can be used.

Additionally, for example, RD cost calculation may be performed by adding additional weights to the RD cost function. For example, the weight w may be determined

TABLE 2

| merge data( x0, y0, cbWidth, cbHeight, cbType ) { | Descriptor |
|---|---|
| ... | |
|   if( sps_clip_enabled_flag && sps_gpm_enabled_flag & | |
|     sh_slice_type = = B && | |
|     cu_skip_flag[ x0 ][ y0 ] = = 0 && cbWidth >= 8 && cbHeight >= 8 && | |
|     cbWidth < ( 8 * cbHeight ) && cbHeight < ( 8 * cbWidth ) && | |
|     cbWidth < 128 && cbHeight < 128 ) | |
|     ciip flag[ x0 ][ y0 ] | ae(v) |
|   if( ciip_flag[ x0 ] y0 ] && MaxNumMergeCand > 1 ) | |
|     merge_idx[ x0 ][ y0 ] | ae(v) |
| ... | |
| } | | empirically or based on block statistics such as the number of potential derived modes for intra modes, the number of available surrounding blocks, etc. Additionally, when amplifying the RD cost, CUs may not be frequently coded in CIIP mode. This may be useful in cases where the motion information is too diverse (e.g., a large motion vector exceeding a predetermined threshold), such as when the accuracy of inter prediction may be reduced even though the CU is coded in merge mode. Conversely, this may not be the case if RD costs can be reduced.

Or, as another example, when multiple DIMD and/or TIMD modes are used, it may be necessary to signal the index of the derived mode.

Or, as another example, a combination signaling technique can be used, where the first bin can be used to indicate whether the CIIP prediction should be coded in CIIP mode. Following the first bin, additional bins may be used to indicate which of the derived modes can be used. This can be used when only DIMD-derived mode in CIIP prediction, or TIMD-derived mode, or mode derived from a harmonized structure that can combine DIMD. TIMD and/or other derived intra techniques are considered.

For example, the modes used may be coded using context coded/fixed length coded or other suitable methods.

For example, it may be advantageous to use fixed length coding if the probability of the TIMD/DIMD index is equi-probable when multiple derived modes are considered.

For example, if additional context coded bins are signaled, a single context model or multiple context models can be used. Additionally, for example, the number of context models to use can be determined by considering various parameters. At this time, the number of context models to be used can be determined using available neighboring blocks, that is, the left neighboring block, the upper neighboring block, both the left neighboring block and the upper neighboring block, or other available neighboring blocks. In other words, the number of context models to be used can be determined using at least one of the neighboring blocks including the left neighboring block or the upper neighboring block.

As another example, it may be possible to determine the number of context models and their initialization values using block-related information. For example, the average, median luma block, subblock intensities, and/or other appropriate block statistics may be used to determine the number of context models and their initialization values.

Or, as another example, it may be possible to signal one bin/flag after the CIP flag is signaled to indicate whether the derived intra mode or the planner mode can be used to calculate the CIIP. In other words, after the CIIP flag is signaled, one bin/flag can be signaled to indicate whether the intra mode derived from CIP or the planner mode is used.

Meanwhile, CIIP usage in VVC is limited to coding units that contain at least 64 luma samples and the height and width of the CU are less than 128 luma samples. At this time, CIIP cannot be used for other block sizes.

In this regard, for example, if a larger CU size needs to be used, the CU can be divided into several subblocks as follows:

For example, a CU can be divided into subblocks vertically or horizontally depending on the size (dimension) of the block. For example, if the height of a block is greater than the width of the block, it can be divided into small subblocks in the horizontal direction. Similarly, if the width of a block is greater than the height of the block, it can be divided into smaller subblocks in the vertical direction.

Additionally, for example, a CU may be split equally or unequally to create subblocks.

Additionally, for example, if a CU has one free surrounding block spanning the width of the CU and two or more free surrounding blocks spanning the height of the CU, subblocks can be created so that the width of the subblock matches the width of the CU and corresponds to the height of the surrounding block.

Or, as another example, the CU may be divided into a combination of subblocks of the same size and subblocks of different sizes. For example, a CU may be divided into n subblocks, and each subblock may be further divided. In this case, n may be greater than 1. Additionally, for example, all and/or some of the n blocks may be subdivided, and various factors used to determine whether the n blocks need to be subdivided may be used. Also, for example, mean/variance luma or mean/variance motion activity and/or other suitable parameters can be used to determine whether each n subblocks need to be partitioned to apply CIIP. Also, for example, CIIP may be applied to all or some of the subblocks. Additionally, subblocks to which CIP is applied can be signaled or derived implicitly.

Additionally, for example, if the CIIP flag is signaled for each subblock, one context coded bin may be signaled to indicate whether CIP applies. For example, the number of context models and their initialization values can be determined empirically by examining block statistics such as available surrounding blocks, number of reference lines, block/subblock within the current CTU, etc.

Additionally, for example, if the number of neighboring possible blocks is greater than the threshold "T", the number of subblocks may be parsed from the bitstream. Additionally, if the number of available neighboring blocks is less than the threshold "T", default rules may be applied, which may be determined empirically.

Or, as another example, it may be possible to assign/use different weights for inter and intra modes to calculate CIIP prediction. For example, several factors may be considered in determining weights.

For example, examining the number of lines of a reference pixel may be an example. This can be useful for determining weights in inter prediction. That is, as the number of reference lines decreases, the weight for inter prediction may decrease.

Or, for example, if the upper neighboring block belongs to another CUT at the picture boundary, the weight for inter prediction may be 0 or close to 0.

Additionally, it may be possible to minimize the weight assigned to intra prediction. This can be done in cases where there are no derived intra modes available.

According to the above, when applying CIIP to the current block, the intra prediction mode is derived based on DIMD modes or TIMD modes to reduce the overhead that occurs during the intra prediction mode signaling process, it can improve overall coding efficiency. Additionally, prediction accuracy can be increased by effectively applying CIIP to the current block using DIMD modes or TIMD modes.

Figure 14:
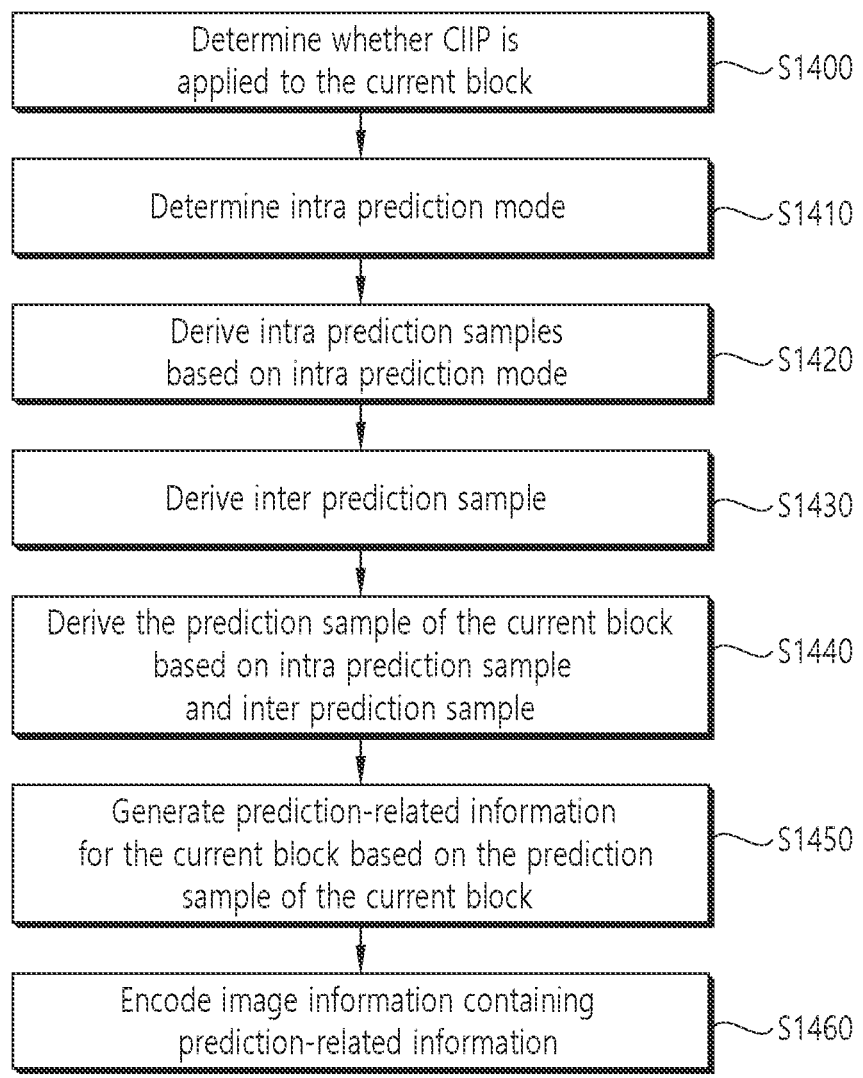
FIGS. 14 and 15 schematically show an example of a video/image encoding method and related components according to an embodiment of this document.
Figure 15:
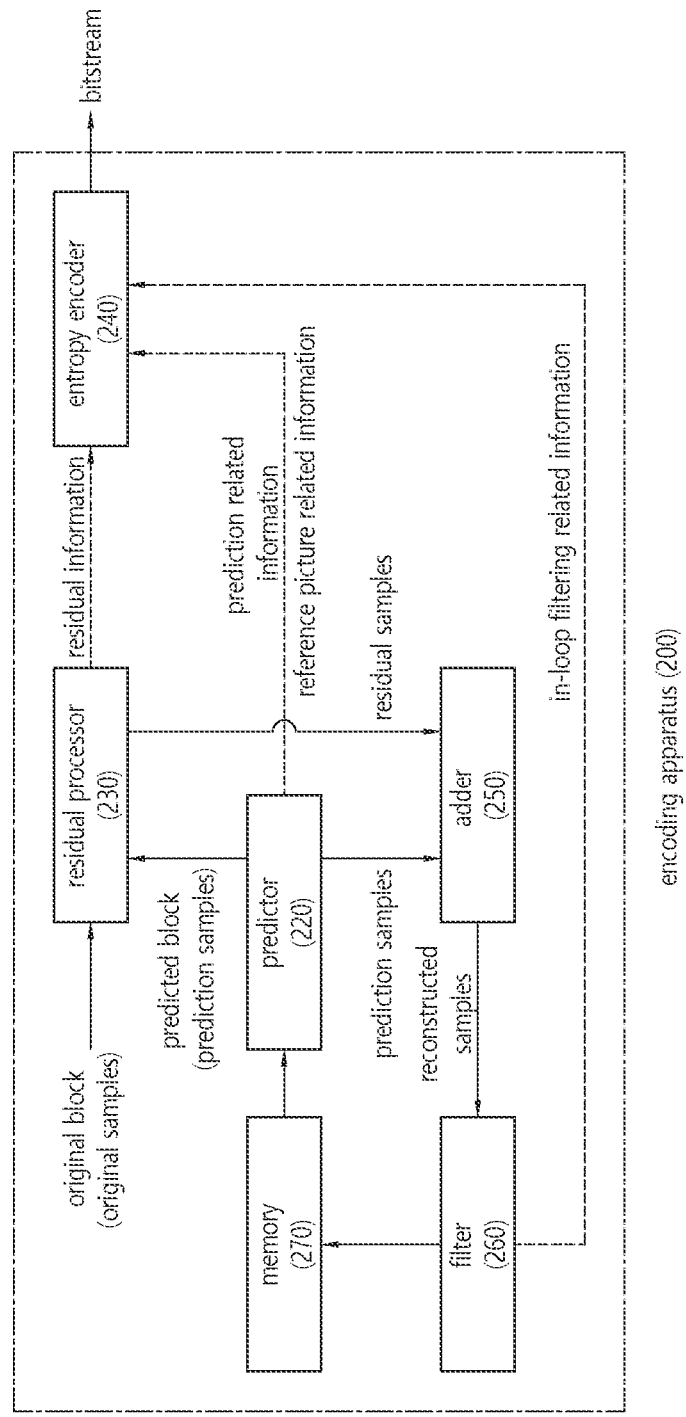

FIGS. 14 and 15 schematically show an example of a video/image encoding method and related components according to an embodiment of this document.

The method disclosed in FIG. 14 may be performed by the encoding device disclosed in FIG. 2 or FIG. 15. Specifically, for example, S1400 to S1450 of FIG. 14 may be performed by the prediction unit 220 of the encoding device of FIG. 15, S1460 may be performed by the entropy encoding unit 240 of the encoding device of FIG. 15. In addition, although not shown in FIG. 14, residual samples or residual information can be derived by the residual processing unit 230 of the encoding device, a bitstream may be generated from residual information or prediction-related information by the entropy encoding unit 240 of the encoding device. The method disclosed in FIG. 14 may include the embodiments described above in this document.

Referring to FIG. 14, it is determined whether CIP (Combined Inter-picter merge and Intra-picture Prediction) is applied to the current block (S1400). For example, the encoding device may determine whether CIP is applied to the current block according to the above-described embodiment.

The encoding device determines the intra prediction mode (S1410). For example, the encoding device may determine an intra prediction mode according to the above-described embodiment. Additionally, the encoding device derives an intra prediction sample based on the intra prediction mode (S1420). For example, the encoding device may derive an intra prediction sample based on the intra prediction mode according to the above-described embodiment.

For example, the intra prediction mode may be determined based on DIMD mode or TIMD mode. For example, the DIMD mode may be derived based on surrounding reference samples of the current block, and the TIMD mode may be derived based on the template of the current block.

Additionally, for example, based on the DIMD mode being applied to the current block, the intra prediction mode may be determined based on neighboring reference samples of the current block. At this time, the intra prediction sample may be generated based on performing a weighted-average based on the first intra prediction sample and the second intra prediction sample, the DIMD mode may include a first DIMD mode and a second DIMD mode. Additionally, the first intra prediction sample may be derived based on the first DIMD mode, the second intra prediction sample may be derived based on the second DIMD mode. At this time, the weight for the first intra prediction sample and the weight for the second intra prediction sample may be the same. Additionally, the weight for the first intra prediction sample and the weight for the second intra prediction sample may not be the same.

Additionally, for example, based on the TIMD mode being applied to the current block, the intra prediction mode may be determined based on the template of the current block. At this time, the intra prediction sample may be generated based on performing a weighted average based on the first intra prediction sample and the second intra prediction sample, the TIMD mode may include a first TIMD mode and a second TIMD mode. Additionally, the first intra prediction sample may be derived based on the first TIMD mode, the second intra prediction sample may be derived based on the second TIMD mode. At this time, the weight for the first intra prediction sample and the weight for the second intra prediction sample may be the same. Additionally, the weight for the first intra prediction sample and the weight for the second intra prediction sample may not be the same.

Additionally, for example, the DIMD mode for the intra prediction mode may be determined based on rate distortion cost. At this time, the rate distortion cost may be determined based on neighboring samples of the current block. Additionally, the TIMD mode for the intra prediction mode may also be determined based on rate distortion cost.

Additionally, for example, the current block may be partitioned into subblocks of the current block based on the size of the current block. At this time, the current block may be partitioned vertically or horizontally and partitioned into the subblocks based on the shape of the current block. That is, if the height of the current block is greater than the width of the current block, the current block may be partitioned in the horizontal direction and partitioned into subblocks, if the width of the current block is greater than the height of the current block, the current block may be partitioned in the vertical direction and partitioned into subblocks. Additionally, CIIP may be applied to at least one of the subblocks.

The encoding device derives an inter prediction sample (S1430). For example, the encoding device may derive inter prediction samples according to the above-described embodiment.

For example, the inter prediction sample may be generated based on performing a weighted average based on the first inter prediction sample and the second inter prediction sample.

The encoding device derives a prediction sample of the current block based on the intra prediction sample and the inter prediction sample (S1440). For example, the encoding device may derive a prediction sample of the current block based on the intra prediction sample and the inter prediction sample according to the above-described embodiment.

For example, the prediction sample may be derived based on performing a weighted average of intra prediction samples and inter prediction samples. At this time, the weight for the intra prediction sample and the weight for the inter prediction sample may be determined based on the number of reference lines.

Prediction-related information is generated based on the prediction sample of the current encoded block (S1450). For example, the encoding device may generate prediction-related information based on the prediction sample of the current block according to the above-described embodiment.

The encoding device encodes image information including prediction-related information (S1460). For example, the encoding device may encode image information including prediction-related information according to the above-described embodiment.

For example, the image information may include at least one of a CIIP flag, DIMD-related information, or TIMD-related information. The CIP flag may be related to whether CIIP is applied to the current block Additionally, the DIMD-related information may include index information related to the DIMD mode, and the TIMD-related information may include index information related to the TIMD mode.

Additionally, for example, the bin for the CIP flag may be encoded based on a context model, bins for at least one of the index information related to the DIMD mode or the index information related to the TIMD mode may be encoded based on context models. At this time, the number of context models may be determined based on neighboring samples of the current block.

Additionally, for example, the image information may include a flag related to whether the DIMD mode is used to derive the intra prediction mode. At this time, the flag may be configured to be parsed after the CIIP flag. Similarly, the image information may include a flag related to whether the TIMD mode is used to derive the intra prediction mode. At this time, the flag may be configured to be parsed after the CIIP flag.

Figure 16:
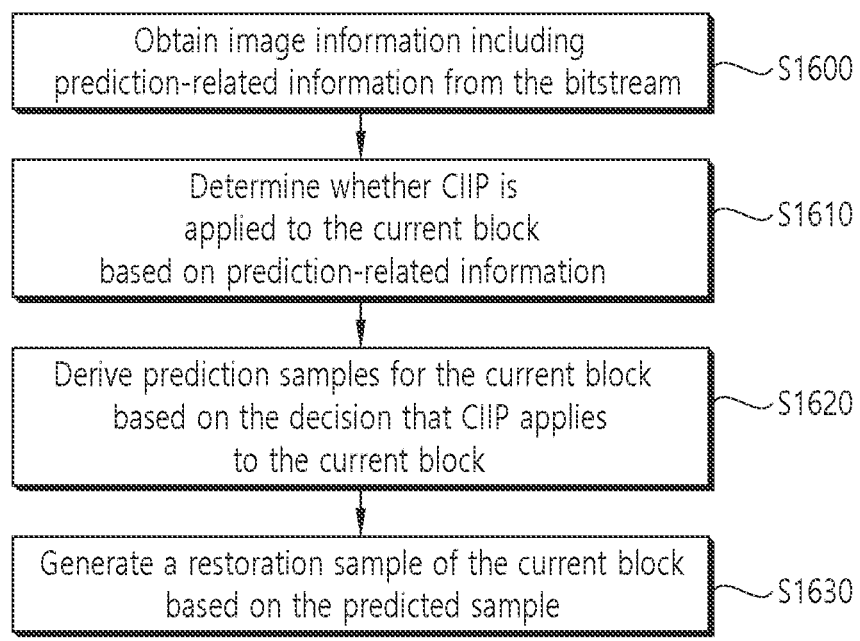
FIGS. 16 and 17 schematically show an example of a video/image decoding method and related components according to an embodiment of this document.
Figure 17:
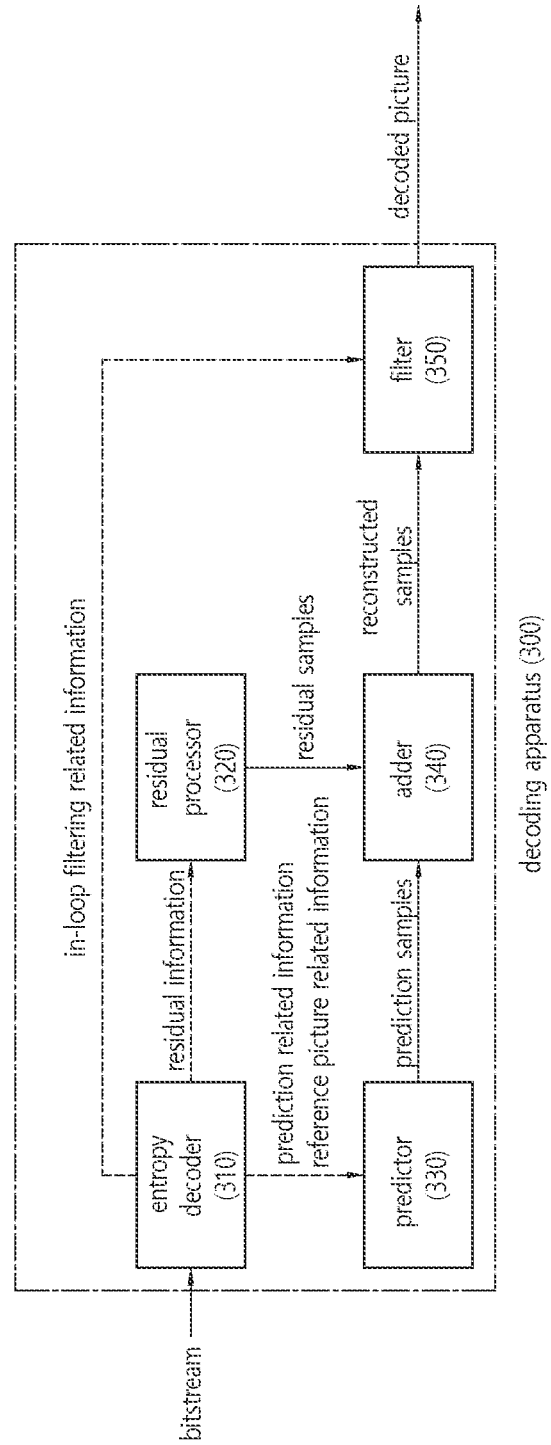

FIGS. 16 and 17 schematically show an example of a video/image decoding method and related components according to an embodiment of this document.

The method disclosed in FIG. 16 may be performed by the decoding device disclosed in FIG. 3 or FIG. 17. Specifically, for example, S1600 of FIG. 16 may be performed by the entropy decoding unit 310 of the decoding device, S1610 to S1620 of FIG. 16 may be performed by the prediction unit 330 of the decoding device, S1630 of FIG. 16 may be performed in the adder 340 of the decoding device. In addition, although not shown in FIG. 16, residual samples can be derived from the residual processing unit 320 of the decoding device in FIG. 16. The method disclosed in FIG. 16 may include the embodiments described above in this document.

Referring to FIG. 16, the decoding device obtains image information including prediction-related information from the bitstream (S1600). The decoding device can obtain image information including prediction-related information from a bitstream according to the above-described embodiment.

For example, the image information may include at least one of a CIP flag, DIMD-related information, or TIMD-related information. At this time, the CIIP flag may be related to whether CIIP is applied to the current block, the DIMD-related information may include index information related to the DIMD mode, the TIMD-related information may include index information related to the TIMD mode.

Additionally, for example, the bin for the CUIP flag may be decoded based on a context model, bins for at least one of the index information related to the DIMD mode or the index information related to the TIMD mode may be decoded based on context models. At this time, the number of context models may be determined based on neighboring samples of the current block.

Additionally, for example, the image information may include a flag related to whether the DIMD mode is used to derive the intra prediction mode. At this time, the flag may be parsed after the CUIP flag.

Additionally, for example, the image information may include a flag related to whether the TIMD mode is used to derive the intra prediction mode. At this time, the flag may be parsed after the CIIP flag.

The decoding device determines whether CIIP (Combined Inter-picter merge and Intra-picture Prediction) is applied to the current block based on prediction-related information (S1610). The decoding device may determine whether CIP is applied to the current block based on prediction-related information according to the above-described embodiment.

The decoding device derives a prediction sample of the current block based on the determination that CIIP is applied to the current block (S1620). The decoding device may derive a prediction sample of the current block based on the determination that CIIP is applied to the current block according to the above-described embodiment.

For example, the intra prediction sample may be derived based on the intra prediction mode for the current block. At this time, the intra prediction mode may be derived based on DIMD (Decoder Side intra Mode Derivation) mode or TIMD (Template-based Inter Mode Derivation) mode.

Additionally, for example, based on the DIMD mode being applied to the current block, it may be derived based on surrounding reference samples of the current block. At this time, the intra prediction sample may be generated based on performing a weighted-average based on the first intra prediction sample and the second intra prediction sample, the DIMD mode may include a first DIMD mode and a second DIMD mode. Additionally, the first intra prediction sample may be derived based on the first DIMD mode, the second intra prediction sample may be derived based on the second DIMD mode. At this time, the weight for the first intra prediction sample and the weight for the second intra prediction sample may be the same. Additionally, the weight for the first intra prediction sample and the weight for the second intra prediction sample may not be the same.

Additionally, for example, based on the TIMD mode being applied to the current block, it may be derived based on the template of the current block. At this time, the intra prediction sample may be generated based on performing a weighted average based on the first intra prediction sample and the second intra prediction sample, the TIMD mode may include a first TIMD mode and a second TIMD mode. Additionally, the first intra prediction sample may be derived based on the first TIMD mode, and the second intra prediction sample may be derived based on the second TIMD mode. At this time, the weight for the first intra prediction sample and the weight for the second intra prediction sample may be the same. Additionally, the weight for the first intra prediction sample and the weight for the second intra prediction sample may not be the same.

Additionally, for example, the DIMD mode for the intra prediction mode may be determined based on rate distortion cost. At this time, the rate distortion cost may be determined based on neighboring samples of the current block. Additionally, the TIMD mode for the intra prediction mode may also be determined based on rate distortion cost.

Additionally, for example, the current block may be partitioned into subblocks of the current block based on the size of the current block. At this time, the current block may be partitioned vertically or horizontally and partitioned into the subblocks based on the shape of the current block. That is, if the height of the current block is greater than the width of the current block, the current block may be partitioned in the horizontal direction and partitioned into subblocks, if the width of the current block is greater than the height of the current block, the current block may be partitioned in the vertical direction and partitioned into subblocks.

Additionally, for example, the prediction sample may be derived based on performing a weighted average of intra prediction samples and inter prediction samples. At this time, the weight for the intra prediction sample and the weight for the inter prediction sample may be determined based on the number of reference lines.

The decoding device generates a restored sample of the current block based on the prediction sample (S1630). The decoding device may generate a restored sample of the current block based on the prediction sample according to the above-described embodiment.

For example, the decoding device may generate a restored sample of the current block based on the prediction sample and residual sample of the current block. At this time, the residual sample may be derived based on residual-related information, and the residual-related information may be included in image information signaled through a bitstream and may be derived from the image information.

According to this document described above, a prediction sample of the current block is derived based on CIP being applied to the current block, the prediction sample of the current block may be derived based on intra prediction samples and inter prediction samples. At this time, the intra prediction mode may be derived based on DIMD (Decoder Side Intra Mode Derivation) mode or TIMD (Template-based Inter Mode Derivation) mode. Accordingly, when applying CIIP to the current block, by deriving the intra prediction mode based on DIMD mode or TIMD mode, the overhead that occurs during the intra prediction mode signaling process is reduced, it can improve overall coding efficiency. Additionally, prediction accuracy can be increased by deriving a prediction sample based on the DIMD mode or an intra prediction mode derived based on the DIMD mode.

The decoding apparatus may receive information on the residual of the current block when residual samples of the current block are present. The information on the residual may include transform coefficients on residual samples. The decoding apparatus may derive residual samples (or residual sample array) for the current block based on the residual information. Specifically, the decoding apparatus may derive quantized transform coefficients based on residual information. Quantized transform coefficients may have a one-dimensional vector form based on a coefficient scanning order. The decoding apparatus may derive transform coefficients based on a dequantization process for the quantized transform coefficients. The decoding apparatus may derive residual samples based on transform coefficients.

The decoding apparatus may generate reconstructed samples based on (intra) prediction samples and residual samples, and may derive a reconstructed block or a reconstructed picture based on the reconstructed samples. Specifically, the decoding apparatus may generate reconstructed samples based on the sum of (intra) prediction samples and residual samples. As described above, the decoding apparatus may then apply an in-loop filtering process such as deblocking filtering and/or SAO process to the reconstructed picture in order to improve subjective/objective picture quality, if necessary.

For example, the decoding apparatus may decode a bitstream or encoded information to obtain image information including all or some of the above information (or syntax elements). In addition, the bitstream or encoded information may be stored in a computer-readable storage medium, and may cause the above-described decoding method to be performed.

In the above-described embodiment, the methods are described based on the flowchart having a series of steps or blocks. The disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The above-described method according to the embodiments of this document may be implemented in the form of software, and the encoding apparatus and/or decoding apparatus according to this document may be included in, for example, a TV, computer, smartphone, set-top box, display device, etc. that that performs the processing.

When the embodiments in this document are implemented as software, the above-described method may be implemented as a module (process, function, etc.) that performs the above-described functions. A module can be stored in memory and executed by a processor. The memory may be internal or external to the processor, and may be coupled with the processor in a variety of well-known means. A processor may include an application-specific integrated circuit (ASIC), other chipsets, logic circuits, and/or data processing devices. Memory may include read-only memory (ROM), random access memory (RAM), flash memory, memory cards, storage media, and/or other storage devices. That is, the embodiments described in this document may be implemented and performed on a processor, microprocessor, controller, or chip. For example, functional units shown in each drawing may be implemented and performed on a computer, processor, microprocessor, controller, or chip. In this case, information for implementation (eg, information on instructions) or an algorithm may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VOD service providing apparatus, an Over the top (OTT) video apparatus, an Internet streaming service providing apparatus, a three-dimensional (3D) video apparatus, a virtual reality (VR) apparatus, an augmented reality (AR) apparatus, a teleconference video apparatus, a transportation user equipment (e.g., vehicle (including autonomous vehicles) user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the embodiment(s) present disclosure is applied may be produced in the form of a program that is to be executed by a computer and may be stored in a computer-readable recording medium. Multimedia data having a data structure according to the embodiment(s) of the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiment(s) of the present disclosure may be implemented with a computer program product according to program codes, and the program codes may be performed in a computer by the embodiment(s) of the present disclosure. The program codes may be stored on a carrier which is readable by a computer.

Figure 18:
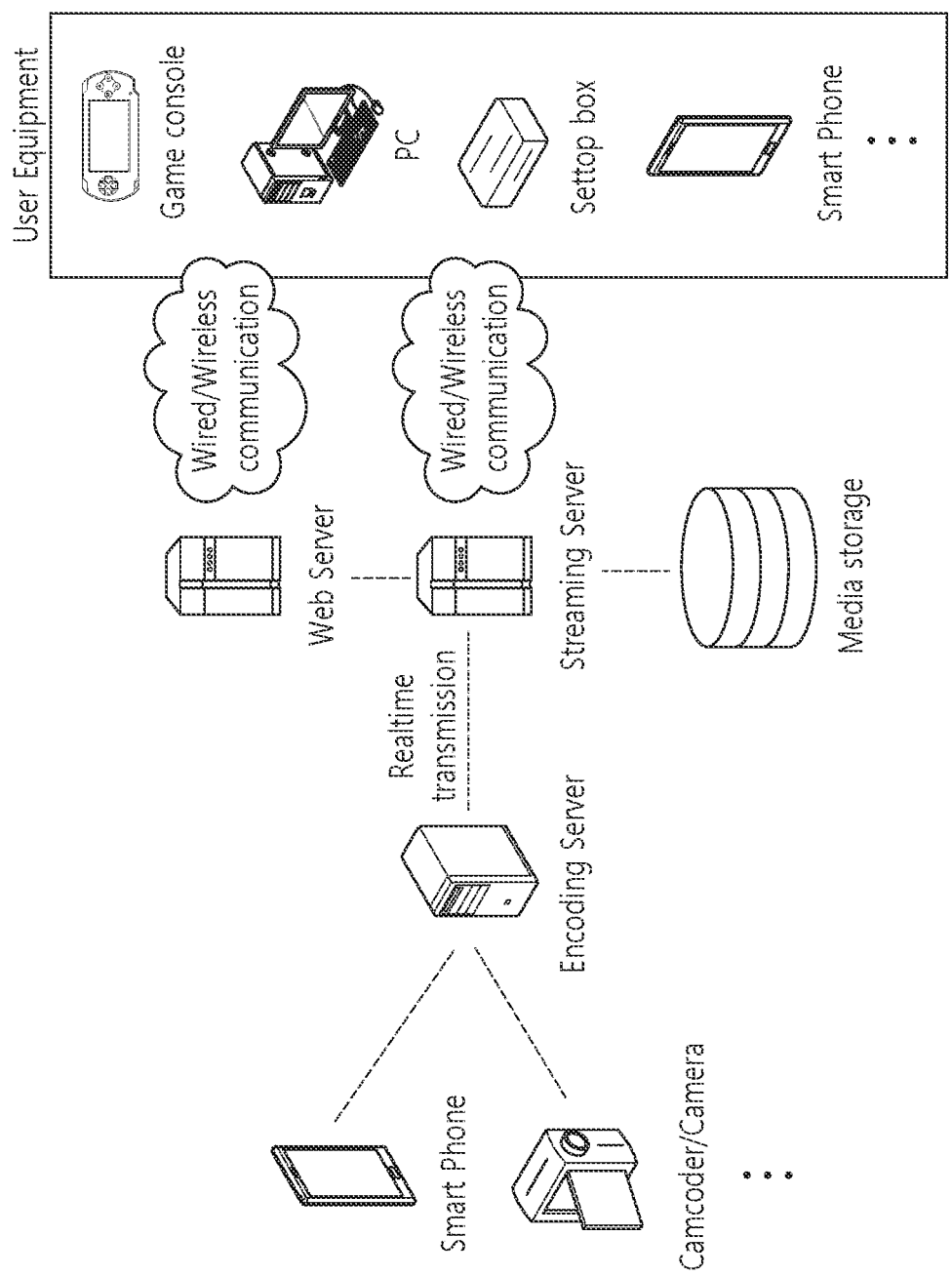
FIG. 18 illustrates a structural diagram of a contents streaming system to which the present disclosure may be applied.

FIG. 18 illustrates a structural diagram of a contents streaming system to which the present disclosure may be applied.

Referring to FIG. 18, a content streaming system to which embodiments of this document are applied may largely include an encoding server, a streaming server, a web server, a media storage, a user apparatus, and a multimedia input apparatus.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment (s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

Each server in the content streaming system may be operated as a distributed server, and in this case, data received from each server may be distributedly processed.

The claims described in the present disclosure may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined to be implemented as a method.

What is claimed is:

1. An image decoding method performed by a decoding apparatus, the image decoding method comprising:
    obtaining image information including prediction-related information from a bitstream;
    determining whether combined inter-picture merge and intra-picture prediction (CIIP) is applied to a current block based on the prediction-related information;
    deriving a prediction sample of the current block based on determining that the CIIP is applied to the current block; and
    generating a reconstructed sample of the current block based on the prediction sample,
    wherein the prediction sample of the current block is derived based on an intra prediction sample and an inter prediction sample,
    wherein the intra prediction sample is derived based on an intra prediction mode, and
    wherein the intra prediction mode is derived based on decoder side intra mode derivation (DIMD) mode or template-based inter mode derivation (TIMD) mode, and
    wherein the inter prediction sample is generated based on a weighted-average based on a first inter prediction sample and a second inter prediction sample.

2. The image decoding method of claim 1, wherein the intra prediction sample is generated based on performing a weighted-average based on a first intra prediction sample and a second intra prediction sample,
    wherein the DIMD mode includes a first DIMD mode and a second DIMD mode,
    wherein the first intra prediction sample is derived based on the first DIMD mode, and
    wherein the second intra prediction sample is derived based on the second DIMD mode.

3. The image decoding method of claim 1, wherein the intra prediction sample is generated based on performing a weighted-average based on a first intra prediction sample and a second intra prediction sample,
    wherein the TIMD mode includes a first TIMD mode and a second TIMD mode,
    wherein the first intra prediction sample is derived based on the first TIMD mode, and
    wherein the second intra prediction sample is derived based on the second TIMD mode.

4. The image decoding method of claim 1, wherein the image information includes at least one of a CIIP flag, DIMD-related information, or TIMD-related information,
    wherein the DIMD-related information includes index information related to the DIMD mode, and
    wherein the TIMD-related information includes index information related to the TIMD mode.

5. The image decoding method of claim 4, wherein a bin for the CIIP flag is decoded based on a context model,
    wherein bins for at least one of the index information related to the DIMD mode or the index information related to the TIMD mode are decoded based on context models, and
    wherein a number of the context models is determined based on neighboring samples of the current block.

6. The image decoding method of claim 1, wherein the image information includes a CIIP flag and a flag related to whether the DIMD mode is used to derive the intra prediction mode, and
    wherein the flag is parsed after the CIIP flag.

7. The image decoding method of claim 1, wherein the current block is partitioned into subblocks of the current block based on a size of the current block, and
    wherein the current block is partitioned into the subblocks by being partitioned vertically or horizontally based on a shape of the current block.

8. The image decoding method of claim 7, wherein the CIIP is applied to at least one of the subblocks.

9. An image encoding method performed by an encoding apparatus, the image encoding method comprising:
    determining whether combined inter-picture merge and intra-picture prediction (CIIP) is applied to a current block;
    determining an intra prediction mode;
    deriving an intra prediction sample based on the intra prediction mode;
    deriving an inter prediction sample;
    deriving a prediction sample of the current block based on the intra prediction sample and the inter prediction sample; and
    generating prediction-related information based on the prediction sample of the current block; and
    encoding image information including the prediction-related information, wherein the intra prediction mode is determined based on decoder side intra mode derivation (DIMD) mode or template-based inter mode derivation (TIMD) mode, and wherein the inter prediction sample is generated based on a weighted-average based on a first inter prediction sample and a second inter prediction sample.

10. The image encoding method of claim 9, wherein the intra prediction sample is generated based on performing a weighted-average based on a first intra prediction sample and a second intra prediction sample, wherein the DIMD mode includes a first DIMD mode and a second DIMD mode, wherein the first intra prediction sample is derived based on the first DIMD mode, and wherein the second intra prediction sample is derived based on the second DIMD mode.

11. The image encoding method of claim 9, wherein the intra prediction sample is generated based on performing a weighted-average based on a first intra prediction sample and a second intra prediction sample, wherein the TIMD mode includes a first TIMD mode and a second TIMD mode, wherein the first intra prediction sample is derived based on the first TIMD mode, and wherein the second intra prediction sample is derived based on the second TIMD mode.

12. The image encoding method of claim 9, wherein the image information includes at least one of a CIIP flag, DIMD-related information, or TIMD-related information, wherein the DIMD-related information includes index information related to the DIMD mode, and wherein the TIMD-related information includes index information related to the TIMD mode.

13. The image encoding method of claim 9, wherein the image information includes a CHIP flag and a flag related to whether the DIMD mode is used to derive the intra prediction mode, wherein the flag is configured to be parsed after the CIIP flag.

14. The image encoding method of claim 9, wherein the current block is partitioned into subblocks of the current block based on a size of the current block, and wherein the current block is partitioned into the subblocks by being partitioned vertically or horizontally based on a shape of the current block.

15. A method of transmitting data for image, the method comprising:

obtaining a bitstream for the image, wherein the bitstream is generated based on determining whether combined inter-picture merge and intra-picture prediction (CIIP) is applied to a current block, determining an intra prediction mode, deriving an intra prediction sample based on the intra prediction mode, deriving an inter prediction sample, deriving a prediction sample of the current block based on the intra prediction sample and the inter prediction sample, generating prediction-related information based on the prediction sample of the current block, and encoding image information including the prediction-related information; and transmitting the data including the bitstream, wherein the intra prediction mode is determined based on decoder side intra mode derivation (DIMD) mode or template-based inter mode derivation (TIMD) mode, and wherein the inter prediction sample is generated based on a weighted-average based on a first inter prediction sample and a second inter prediction sample.

\* \* \* \* \*